(12) United States Patent
Chandrasekaran et al.

(10) Patent No.: US 11,057,488 B2
(45) Date of Patent: Jul. 6, 2021

(54) MULTI-STATE MIDTIER CACHE

(71) Applicant: Oracle International Corporation, Redwood Shores, CA (US)

(72) Inventors: Yuvaraj Chandrasekaran, Newark, CA (US); Lawrence Yoo Lindsey, Pleasanton, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/696,415

(22) Filed: Nov. 26, 2019

(65) Prior Publication Data

US 2021/0160337 A1 May 27, 2021

(51) Int. Cl.
*G06F 13/00* (2006.01)
*H04L 29/08* (2006.01)
*G06F 12/0895* (2016.01)

(52) U.S. Cl.
CPC ...... *H04L 67/2823* (2013.01); *G06F 12/0895* (2013.01); *H04L 67/2842* (2013.01); *G06F 2212/154* (2013.01)

(58) Field of Classification Search
CPC ............. H04L 67/2823; H04L 67/2842; G06F 12/0895; G06F 2212/154
USPC ................ 709/236, 203, 217–219, 213–216, 709/220–222
See application file for complete search history.

(56) References Cited

U.S. PATENT DOCUMENTS

| | | | | |
|---|---|---|---|---|
| 10,019,369 B2* | 7/2018 | Roberts | ............... | G06F 12/0895 |
| 2014/0126274 A1* | 5/2014 | Lee | ..................... | G06F 12/0891 365/154 |
| 2015/0363322 A1* | 12/2015 | Howes | ................ | G06F 12/0897 711/144 |
| 2017/0161197 A1* | 6/2017 | Roberts | ............... | G06F 12/0811 |
| 2018/0373646 A1* | 12/2018 | Shwartz | .................. | G06F 21/52 |
| 2020/0151112 A1* | 5/2020 | Shwartz | .................. | G06F 21/62 |

OTHER PUBLICATIONS

"Partial objects get cached and break "actual" objects", doctrine/orm, #7633, retrieved Feb. 27, 2020 from htpps://github.com/doctrine/orm/issues/7633, 5 pages.

* cited by examiner

*Primary Examiner* — Kenneth R Coulter
(74) *Attorney, Agent, or Firm* — Kilpatrick Townsend & Stockton LLP

(57) ABSTRACT

A server includes a data cache for storing data objects requested by mobile devices, desktop devices, and server devices, each of which may execute a different configuration of an application. When a cache miss occurs, the cache may begin loading portions of a requested data object from various data sources. Instead of waiting for the entire object to load to change the object state to "valid," the cache may incrementally update the state through various levels of validity based on the calling application configurations. When a portion of the data object used by a mobile configuration is received, the object state can be upgraded to be valid for mobile devices while data for desktop and other devices continues to load, etc. The mobile portion of the data object can then be sent to the mobile devices without waiting for the rest of the data object to load.

20 Claims, 17 Drawing Sheets

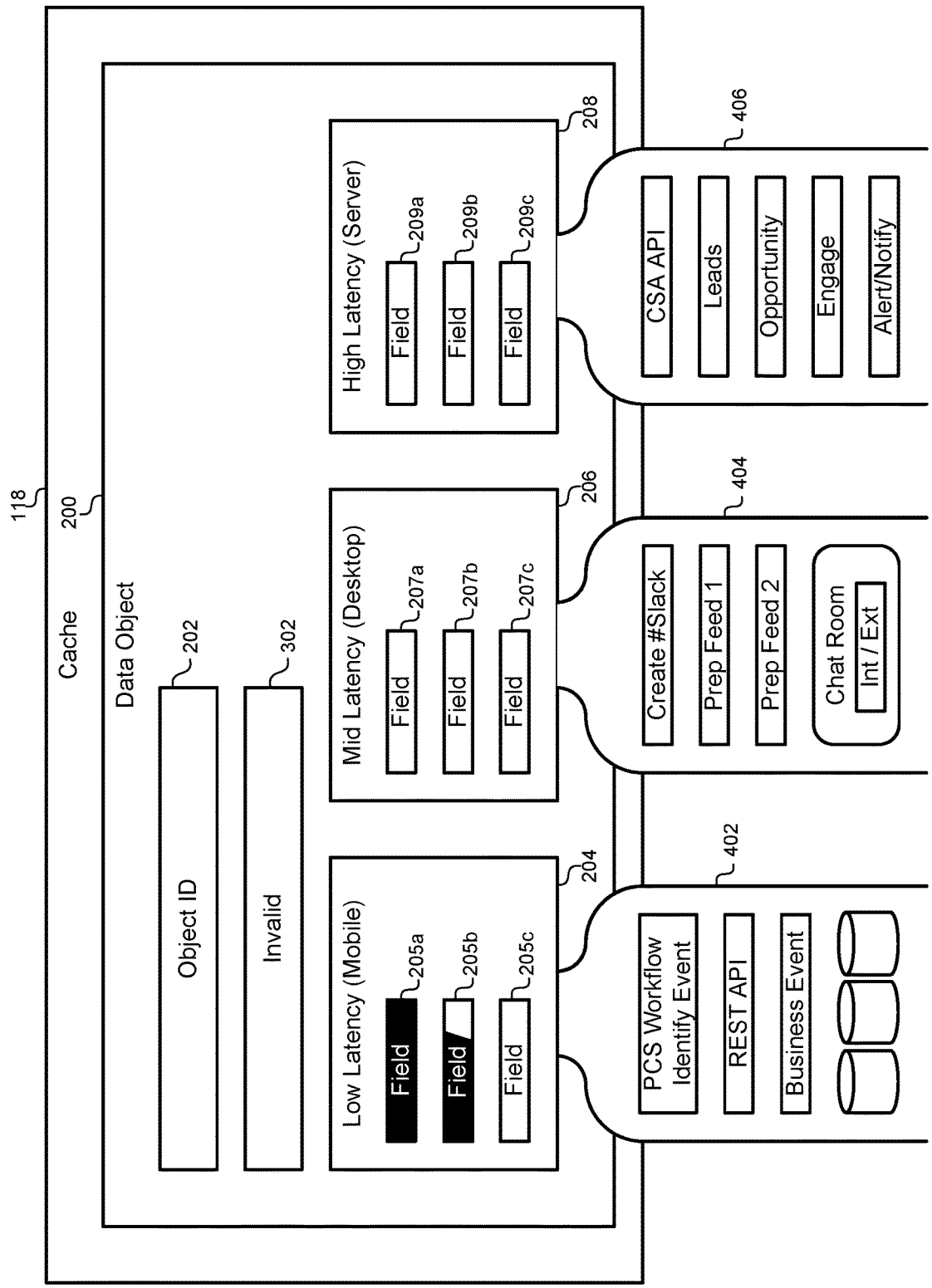

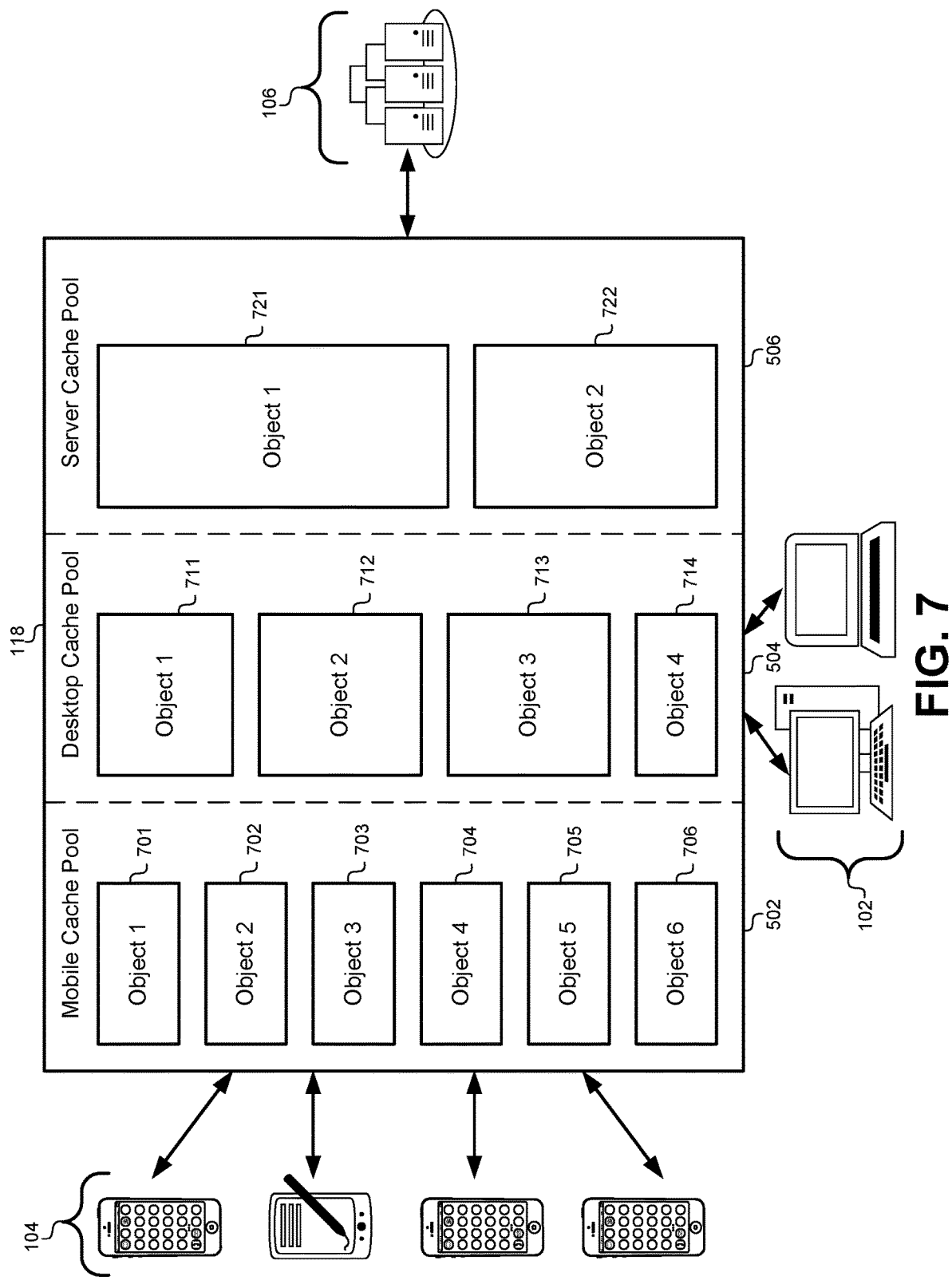

MULTI-STATE MIDTIER CACHE

BACKGROUND

A middle-tier cache may be used to improve the scalability and performance of applications that access data stored in databases by caching frequently used data on a middle-tier system. This type of server allows applications to process many requests that would otherwise exceed their capacity for response. When read-only requests are received, the cache can respond using objects from the cache rather than executing additional queries on the database. This both reduces the bandwidth required for database requests and reduces the load on the database server.

In a traditional multi-tier operating environment running web applications, client devices may include mobile devices, desktop devices, other server devices, and so forth. These client devices may display information, such as HTML or XML sent by to an application running on the client device. Although different versions of an application may run on different types of client devices, the requests made to the server cache for various data objects are the same.

SUMMARY

A server may include a data cache for storing data objects requested by mobile devices, desktop devices, server devices, etc., each of which may execute a different configuration of an application. When a cache miss occurs, the cache may begin loading portions of a requested data object from various data sources. Instead of waiting for the entire object to load to change the object state to "valid," the cache may incrementally update the state through various levels of validity based on the calling application configuration. When a portion of the data object used by a mobile configuration is received, the object state can be upgraded to be valid for mobile devices while data for desktop and other devices continues to load, etc. The mobile portion of the data object can then be sent to the mobile devices without waiting for the rest of the data object to load.

When the server receives a request for a data object from an application, the server can determine the configuration of the application making the request, whether it be mobile (e.g., smart phones, etc.), desktop (e.g., web browsers, desktop computers, etc.), server (e.g., data analytics, machine learning, statistical analysis, etc.), or any other available configuration. If the data object does not exist in the cache, then a request may be made to retrieve the data object from one or more data sources. For large data objects, multiple sources may be queried to provide different portions of the data object to be loaded into the cache. Each of these sources may have varying levels of latency when servicing the request, and thus the data object may be received and loaded into the cache incrementally.

After a portion of the data object is received from the data sources and stored in the cache, the server can determine whether enough of the data object has been received to upgrade the validity state of the object. Instead of using the traditional states of "invalid" and "valid," the cache may use incremental levels of validity that correspond to the different configurations of the application. Data objects can be subdivided into object portions that correspond to what is needed by the different application configurations. For example, mobile applications may only need to display a small portion of the data available in a large data object, while server applications may require all of the data in the data object to perform analytics and machine learning processes. A "mobile" portion of the data object may include data that can be loaded very quickly into the cache, while a "server" portion of a data object may include data that may require more extensive processing and/or requests to external systems before it can be loaded into the cache. When all of the "mobile" portion of the data object is received, it can be sent to the requesting application without waiting for the rest of the data object to load. As additional portions of the data object are received, the validity state can be upgraded incrementally, and the data can be sent to corresponding application configurations as soon as it is ready. These validity states may be organized as a hierarchy such that validity in a higher state (e.g., valid:desktop) implies validity in a lower state (e.g., valid:mobile).

The server may be implemented using a middle-tier server, such as an application server or a web server that acts as an intermediary between requesting client devices and backend data sources. In some implementations, the data cache on the server may be partitioned into different logical partitions based on application configurations. Thus, the cache partitions may match the applications and the different portions of the data objects. For example, mobile portions of a data object may be stored in a mobile partition of the cache. As the request traffic from various configurations of the application varies over time, the size of the various cache partitions can be dynamically resized to match the request traffic. For example, the mobile partition of the cache may be increased to reduce cache misses if the request traffic is primarily received from mobile devices. Portions of a data object in one partition may be overwritten while maintaining portions in another partition. This allows different portions of the data object to be deleted/preserved independent of other portions. When subsequent requests are received, the cache may determine if the corresponding portion of the data object is in the cache, and then only load the missing portions as necessary.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 4 illustrates different orchestration flows that may be used to populate the portions of the data object, according to some embodiments.

FIG. 7 illustrates how the size of various partitions in the cache may be determined based on requests from configurations of the application, according to some embodiments.

DETAILED DESCRIPTION

Described herein are embodiments for using multiple validity states in a middle-tier cache to service requests from applications operating in different configurations. An application server may communicate with versions of an application operating on different types of client devices. These application configurations may include mobile applications, desktop applications, and/or server applications, such as analytics and/or machine learning applications. The server may include a cache that stores objects that are requested by the applications running on the client devices. While traditional caches use a two-state system for determining validity of an object in a cache (e.g., valid or invalid), some embodiments may use a plurality of valid states in the cache to determine when the cache data is valid for each different configuration of the application. When a data object is requested by an application operating in a particular configuration, the data object may begin to be retrieved from a data source and stored in the cache at the server. As data is incrementally received for the data object, the validity of the data object may be improved such that it may become valid for certain application configurations before the entire data object is received. For example, a mobile configuration of the application with limited screen size may only use a small portion of the information in a requested data object. As soon as a portion of the data object needed to service mobile request has been received, the object in the cache may be assigned a "valid:mobile" validity state indicating that the data object is valid, at least for mobile applications. As soon a valid state is received for the requesting application's configuration, the data object may be sent to the application in response to the request.

Figure 1:
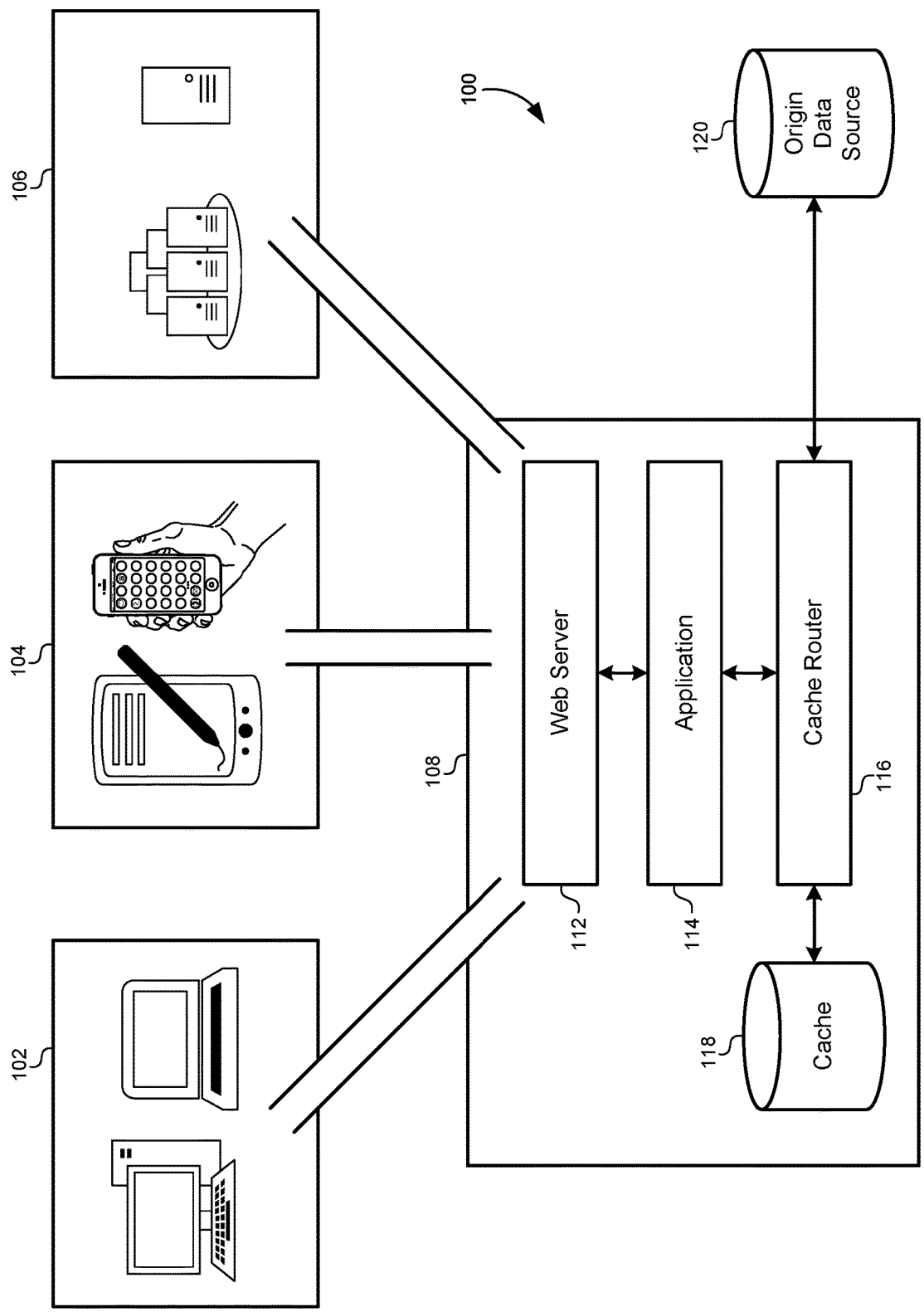
FIG. 1 illustrates a system for a middle-tier server for servicing applications operating on client devices, according to some embodiments.

FIG. 1 illustrates a system 100 for a middle-tier server for servicing applications operating on client devices, according to some embodiments. The system 100 may include a server 108. The server 108 may be referred to herein as a middle-tier server as it acts as an intermediary between client devices and data sources used by applications operating on the client devices. In some embodiments, the server 108 may be implemented as an application server or a web server. For example, the server 108 in FIG. 1 may include a web server 112 and/or an application server 114 operating on one or more processors. The server 108 may also include a cache 118. Maintaining a middle-tier cache may enhance the speed with which application requests may be serviced by the server 108. A cache router 116 may include a process that receives requests from client devices and determines whether a data object responsive to the request is already available in the cache 118. If the requested data object is in the cache 118 from a previous request, the cache router 116 may retrieve the data object from the cache 118 and provide the data object in response to the request. If the requested data object is not in the cache 118, then the cache router 116 may instead send a request to a data source 120 to retrieve the data object to service the request. As the data object is retrieved, the cache router 116 may store the data object in the cache 118 to service future requests for the same data object.

The data source 120 may include a data center, a database, a database management system (DBMS), a web service, an application programming interface (API), a file system, a cloud system, and/or any other device or process that may store application data. The data source 120 may include a plurality of data sources in different environments. As will be described in greater detail below, the data source 120 may include an orchestrated environment with many different orchestration flows, processes, databases, processing modules, algorithms, applications, and so forth, that may be used to store, retrieve, process, and/or organize data into a data object in response to the request. The data source 120 may operate on physically separate hardware that is distinct from the client devices 102, 104, 106 and/or the server 108. For example, the data source 120 may be located in a separate facility and/or on a separate server with different processors and/or operating systems. In some embodiments, the data source 120 may be combined in a cloud system with the server 108.

Requests to the server 108 may be received from many different types of client devices. These client devices may include computing devices that have different display requirements, processing capabilities, and/or memory availability. These different client device types may be grouped into a number of different classifications based on how an application is configured to operate on those client devices. For example, one such classification of client devices may be based on a mobile configuration of the application configured to operate on mobile devices. A classification of mobile devices 104 may be based on having a relatively small screen size, relatively limited processing power, and communication with the server 108 through a wireless or cellular network. The mobile devices 104 may use a particular configuration of an application. For example, the mobile devices 104 may use an "app" version of the application that may be more limited in the available features than a full version of the application. The mobile configuration of the application may require and/or display less data than other configurations of the application. Mobile devices 104 may include tablet computers, personal digital assistants (PDAs), smart phones, smart watches, and/or other small, portable computing devices.

Another classification of client devices may include desktop devices 102. The desktop devices 102 may be distinguished from other device classifications by operating a desktop configuration of the application. The desktop configuration of the application may use more data and have more available features than the mobile configuration of the application. The desktop configuration may include a standalone application, a browser-based web application, a component of an operating system, and/or any other software process that may be run on a desktop client device. Desktop devices 102 may include computing systems such as desktop computers, workstations, thin clients, laptop computers, terminal computers, set-top boxes, and/or other computing devices with greater display capabilities and processing power than the mobile devices 104 described above.

Another classification of client devices may include server devices 106. The server devices 106 may include any server, web service, API, cloud environment, container environment, backend service, and/or any other computing device that may operate in a server configuration. The server devices 106 may be co-located with the server 108 in a same cloud computing environment. The server devices 106 may be characterized in that they operate a server configuration of the application. For example, a server configuration may include a machine learning version of the application, an artificial intelligence version of the application, or any other application configuration that analyzes the application data and generates analytics based on the application data.

These three classifications of client devices and their corresponding application configurations are provided merely by way of example and are not meant to be limiting. Other classifications of mobile devices may be used in other embodiments. For example, some embodiments may include a classification of client devices for augmented/virtual reality devices, and may include an application configuration that operates specifically on the augmented/virtual reality devices. Some embodiments may include an application configuration for smart appliances, such as refrigerators, televisions, digital home assistants, security systems, and so forth. This classification of devices may use an application configuration configured to operate on smart appliances. Therefore, the methods and systems described in this disclosure may be applied equally to any classification of client device and/or application configuration.

Although the different client devices 102, 104, 106 may operate different configurations of the application, each of these different application configurations may request the same data objects from the server 108. The speed and efficiency with which these application configurations can operate may depend at least in part on the speed with which these requests for data objects can be serviced by the server 108. Maintaining a middle-tier cache is one of the most commonly used architectures to enhance the speed of any application. This is particularly true in distributed environments, such as the system in FIG. 1. The speed with which objects can be retrieved from the data source 120 and/or the cache 118 may in large part define the overall speed, efficiency, and/or user satisfaction with the application operating on the client devices 102, 104, 106.

A technical problem exists in current middle-tier cache systems. Specifically, some data objects loaded from the data source 120 may be relatively large. While each configuration of the application may include requests for the same data source 120, individual fields in the data object may require processing and/or additional requests such that a final value for those individual fields is not readily available at the data source 120. This becomes problematic when a mobile configuration of the application only displays a small portion of the data in the data object, while the server configuration of the application may require all of the data in the data object. Traditional caches 118 may use a binary validity system such that data is marked as either "valid" or "invalid." When requesting a large data object, the cache 118 does not mark the data object as valid until it has been received by the cache 118 in its entirety. If the data object requires a relatively long time to populate all of the fields in the data object in the cache 118, then mobile devices 102 may experience a long latency when they only need a small portion of the data object for display.

Some systems have attempted to use separate caches for each application configuration. For example, a separate cache may be used for a mobile configuration of the application that is separate and distinct from a cache used for a desktop configuration of the application. These caches may be separate in that data is not shared between caches, and thus data may be duplicated needlessly between the separate caches—data stored and used in the mobile cache is also needed by the desktop cache. This also adds additional overhead and routing requirements to the cache router 116 to manage separate caches.

The embodiments described herein solve these and other technical problems by adding multiple valid states to cache data. A large data object may be loaded incrementally into the cache 118 as data is received. Data fields in the data object can be subdivided into a plurality of different portions that are characterized according to the different application configurations. As data is received from the data source 120 and loaded into the cache 118, the cache router 116 can determine when individual portions of the data object have been populated and update the validity state of the data object. For example, when the portion of the data object corresponding to the mobile configuration of the application is populated, the cache router 116 can change the validity state of the data object from "invalid" to "valid:mobile" indicating that the data object is valid for mobile configurations of the application. Thus, the server may send the partially populated data object to the mobile client devices 104 for display, even though the remaining portions of the data object corresponding to desktop devices 102 and/or server devices 106 may not have been loaded into the cache 118 yet in their entirety. This process is described in greater detail below.

Figure 2:
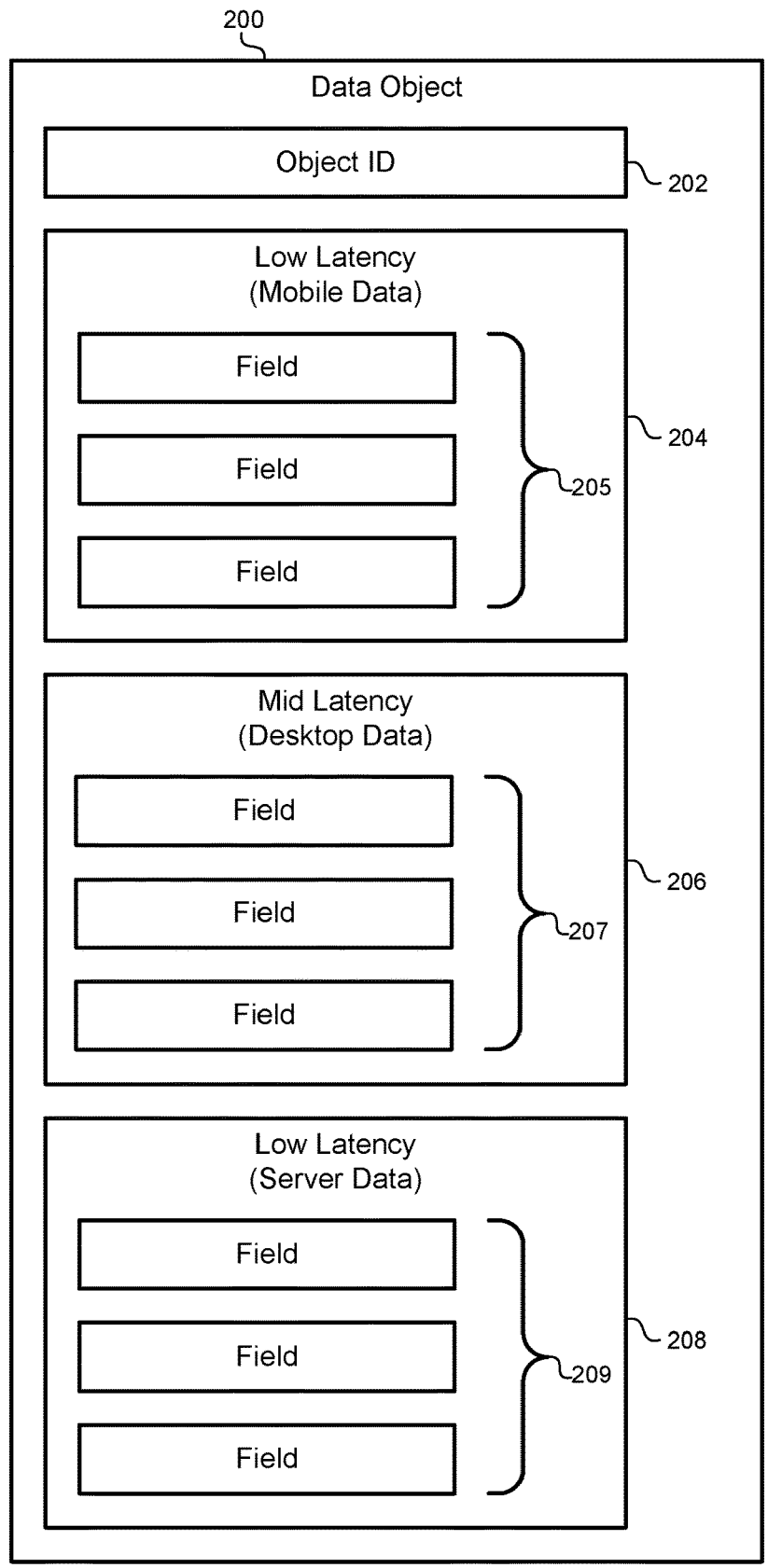
FIG. 2 illustrates a data object divided into portions corresponding to different application configurations, according to some embodiments.

FIG. 2 illustrates a data object divided into portions corresponding to different application configurations, according to some embodiments. The data object 200 may be comprised of a plurality of individual data fields 205, 207, 209. The data object 200 may also include an identifier 202, such as an object ID that uniquely identifies the data object in relation to other data objects requested by the client devices. When the data object 200 is requested from a data source by the middle-tier server (e.g., a cache miss), different fields within the data object 200 may be retrieved using different orchestration flows by the server. Each of these orchestration flows may be associated with a different latency, such that some fields in the data object 200 may be loaded into the cache before others. Thus, data may be loaded into the object 200 in the cache incrementally as it is received. In general, low-latency data may be received before higher-latency data.

Some embodiments may divide the fields in the data object 200 into portions or groupings based on their associated retrieval latency from the data source. In the example of FIG. 2, fields 205 may be associated with one orchestration flow having a relatively low latency. These fields 205 may be divided into a first portion 204 of the data object 200 based on this low latency. Similarly, fields 207 may be grouped into a second portion 206 associated with a medium level of latency, and fields 209 may be grouped into a third portion 208 having a relatively high level of latency.

alternatively or additionally, the portions 204, 206, 208 of the data object 200 may be based on different application configurations. For example, the first portion 204 may include fields 205 that are associated with a mobile configuration of the application. The fields 205 may be displayed on the relatively small display size of a mobile device, and these fields 205 may be all that is required by the mobile device when requesting the data objects 200. As described below, when the fields 205 in the portion 204 of the data object 200 associated with mobile data are received by the cache 118, the data object 200 may be designated as "valid:mobile" and the data object 200 may be sent to the mobile configuration of the application. Similarly, the second portion 206 may include fields 207 that are associated with a desktop configuration of the application. The fields 207 may be used for display in a browser window or in a standalone application on a desktop computing device. The fields 207 may be used by the desktop configuration in addition to the fields 205 that are also used in the mobile configuration. The third portion 208 may include fields 209 that are used by a server configuration of the application. Data in the fields 209 may be used by an analytics process, a machine learning process, an artificial intelligence process, and/or the like, operating in a more powerful server environment.

The latency associated with each of the fields 205, 207, 209 may be affected by many factors. As described in greater detail below, each of these portions may be associated with different orchestration flows or different methods for retrieving the data. For example, the fields 205 considered to be low-latency fields may be simply retrieved from a database or other readily available data source. The fields 207 associated with a medium level of latency may be retrieved from less-available data sources and/or may require data transformations, manipulations, formatting, calculations, and/or other data processing before they are ready to be loaded into the data object 200 in the cache. The fields 209 associated with a relatively high level of latency may require queries to external systems that have longer response times, along with further applications that may need to be executed to process the data before it is ready.

By way of example, the data objects 200 may include a customer object. The identifier 202 may be a unique identifier for the customer. The low-latency fields 205 may include information that is readily available in a database, such as a first name, a last name, a phone number, an address, and so forth. The medium-level latency fields 207 may include information that requires queries to other systems, such as a an order history, a shopping cart, a browsing history, and so forth. The high-level latency fields 209 may include information that is retrieved from external systems or requires extensive processing, and is thus not readily available. This may include delivery times, order tracking histories, lead-generation status, interaction histories, and so forth. Note that the use of a customer object is merely exemplary and is meant only to illustrate the types of data that may be part of a data object requiring various levels of latency when retrieved from the data source(s) described above. Any type of data may be stored in the data object 200.

The data object 200 in FIG. 2 has been partitioned into three different portions associated with low, medium, and high levels of latency. However, this example is not meant to be limiting, and other embodiments may use any number of partitions to generate portions of the data object 200. Some embodiments may use a plurality of portions having two, four, five, six, seven, etc., portions associated with various levels of latency. Additionally, some embodiments may use a plurality of portions in the data object 200 based on any number of application configurations. For example, some embodiments may use portions in the data objects 200 corresponding to mobile configurations, tablet configurations, browser configurations, standalone application configurations, testing configurations, deployment configurations, and so forth. The use of only three configurations of the application and this disclosure is provided merely by way of example and is not meant to be limiting.

Figure 3A:
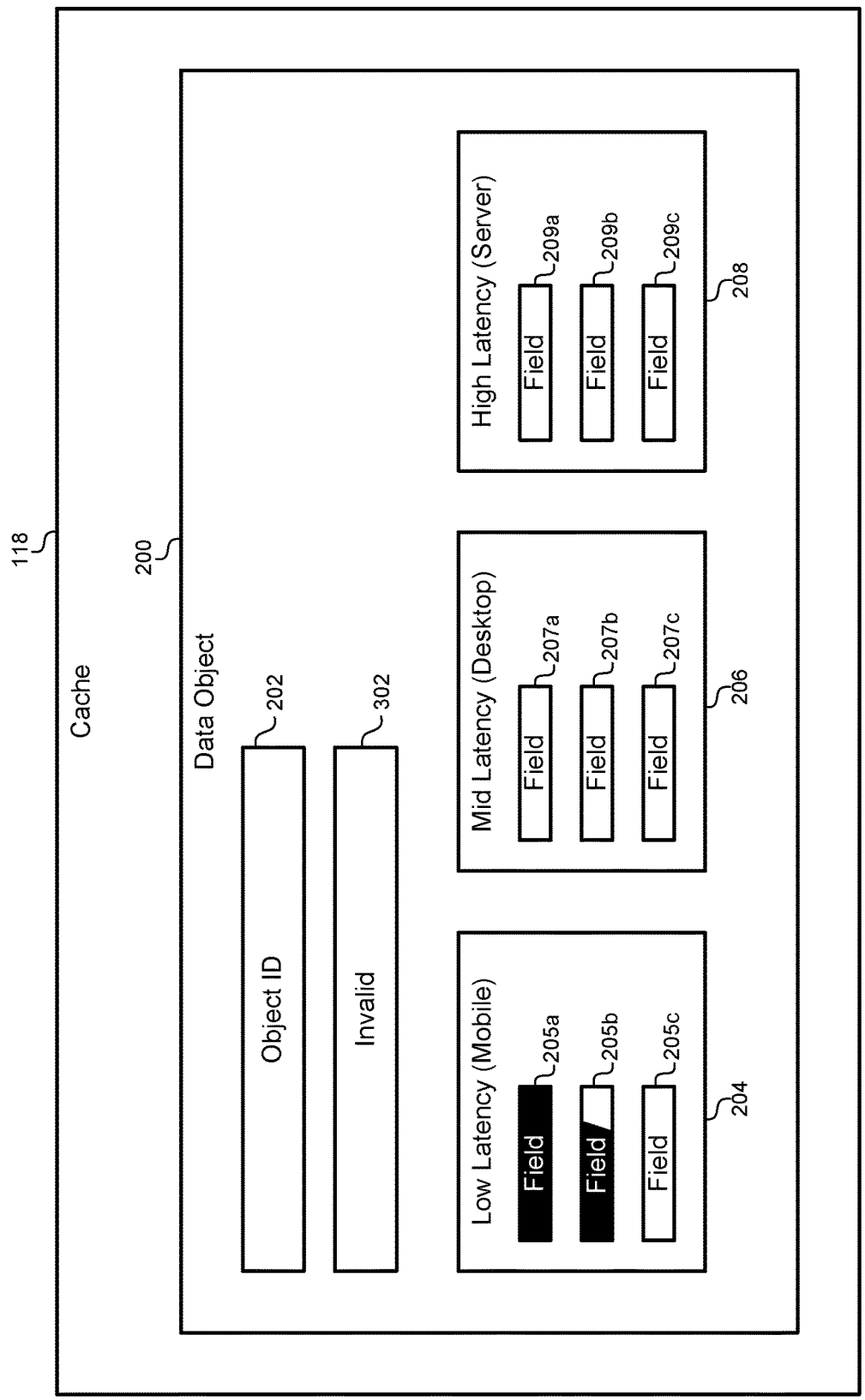
FIG. 3A illustrates an example of a data object as data is loaded incrementally into the cache, according to some embodiments.

FIG. 3A illustrates an example of a data object 200 as data is loaded incrementally into the cache 118, according to some embodiments. In this example, a request may have been made from a configuration of the application to the server for the particular data object 200. In some cases, the application may expressly request this particular data object (e.g., requested by name, ID, address, etc.). In other cases, a request may have been made for which the data object 200 is responsive to the request (e.g., a search for objects meeting one or more criteria). In response to the request, the server may begin loading fields for the data object 200 into the cache 118 as they are received. For example, a request may be made to different orchestration flows or data sources to begin retrieving information to populate the fields of the data object 200. As data is received for these fields, they can be added to the cache incrementally.

In some embodiments, the cache 118 may be represented as a least-recently-used (LRU) cache where the oldest objects in the cache 118 are overwritten first when the cache 118 reaches its capacity. Additionally, the cache 118 may be implemented with many different types of data structures. For example, the cache 118 may be implemented using a linked list data structure. As new portions of the data object 200 are received from the data sources, they may be added as new blocks in the linked list. Each block relating to the data object 200 may be referenced using the object identifier 202 to indicate that the new block is part of the existing data object 200 already in the cache 118. Other implementations may use a key-value store to implement the cache 118, along with other known cache data structures.

A block in the cache 118 storing the data object 200 may include a field for the identifier 202 along with a field indicating the validity state 302 of the data object 200. Prior to this disclosure, an object in a cache used a set of validity states where an object was either valid or invalid. Generally, if all of the fields in a data object had not yet been received by the cache, the data object would be labeled as invalid until all data fields were populated.

In the embodiments described herein, the validity states 302 of the data object 200 may include a plurality of different validity states that go beyond the existing valid/invalid states. As described above, the data object 200 may have fields that are divided into portions 204, 206, 208 that correspond to various configurations of the application and/or the relative latency of the data therein. As the data fields in each of these portions 204, 206, 208 are populated, the validity state 302 may be updated to reflect the current state of these portions of the data object 200.

For example, as the cache 118 begins to receive data for the data object 200, a determination can be made for a validity state for each portion of the data object 200 stored in the cache 118. Generally, the low-latency data may be received first. Therefore, in this example, data populating field 205a in the mobile portion 204 of the data object 200 has been received, and data populating field 205b is currently being received and processed. However, field 205c in the mobile portion 204 has yet to receive data, and thus the system may determine that the data object 200 is still invalid for mobile configurations of the application. Similarly, since data has not yet been received for the desktop portion 206 or the server portion 208, the validity state 302 of the data object will also be invalid for desktop and server configurations of the application. This determination may be made periodically as data is received by the cache 118.

Figure 3B:
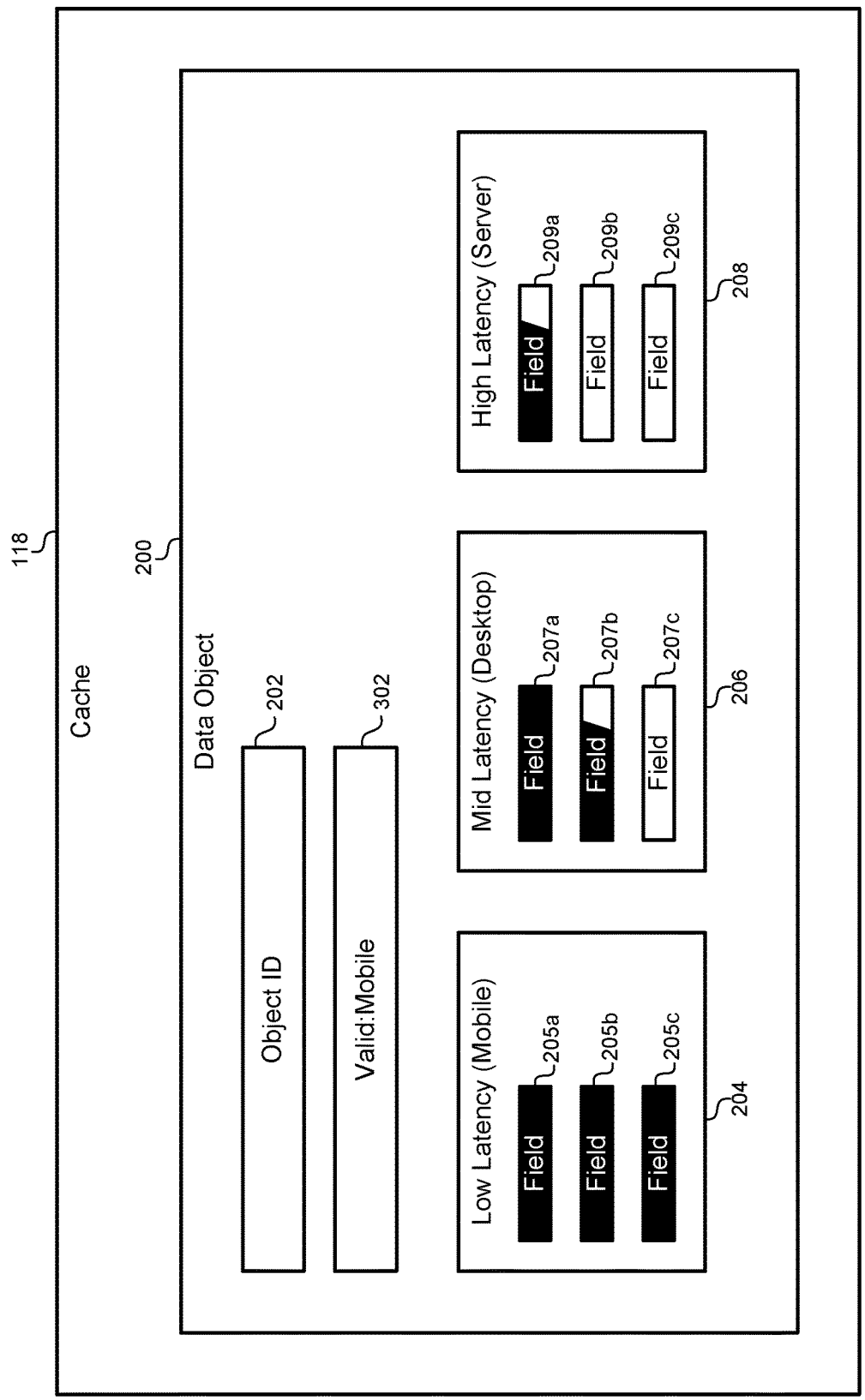
FIG. 3B illustrates a change in validity state for the data object, according to some embodiments.

FIG. 3B illustrates a change in validity state for the data object 200, according to some embodiments. Continuing from the example in FIG. 3A, the final field 205c in the mobile portion 204 of the data object 200 has been populated, thus completing the fields in the low-latency portion of the data object 200. At this stage, a determination can be made by the cache 118 that mobile configurations of the application may use the data object 200. The validity state 302 can be changed from invalid to "valid:mobile." This designation may indicate that the data object 200 is available for mobile applications of the configuration, but not yet for desktop and/or server configurations of the application.

When the validity state 302 changes to valid:mobile, the cache 118 may provide the data object 200 to mobile configurations of the application. Instead of waiting for all of the fields in the data object 200 to be populated, the data object 200 may be provided immediately as the mobile portion 204 of the data object 200 is received. Because mobile configurations of the application have smaller screen sizes and reduced processing capabilities, mobile configurations of the application need not require all of the data provided by the data object 200. For example, a mobile version of an application operating on a smart phone may only display and/or process a small portion of the data in a relatively large data object 200. As described above, the data required by the mobile configuration of the application may be designated in the data object 200 as part of the mobile portion 204 of the data object 200. This greatly increases the speed with which the server can respond to requests from various configurations of the application. Instead of waiting for the entire data object 200 to load into the cache 118 with each request, the server may instead provide the data object 200 as it is received for each application configuration.

In some embodiments, if a mobile version of the application is the only configuration of the application currently requesting the data object 200, the server may cause the cache 118 to stop populating the data object 200 after the mobile portion 204 is populated. If the remaining portions 206, 208 of the data object 200 are not currently needed, the cache 118 may preserve bandwidth and/or cache capacity and stop loading data from the data source(s) for the remainder of the data object 200. In other embodiments, the cache 118 may continue to load the fields and the remaining portions 206, 208 of the data object until they are complete.

Note that the data in the various portions 204, 206, 208 of the data object 200 need not be populated sequentially. Instead, they may be populated as they are received from the various data sources. In this example, the fields 205 in the mobile portion 204 have been completed. At the same time, the fields 207 in the desktop portion 206 are in the process of being completed, and data is beginning to be received for field 209a in the server portion 208.

Figure 3C:
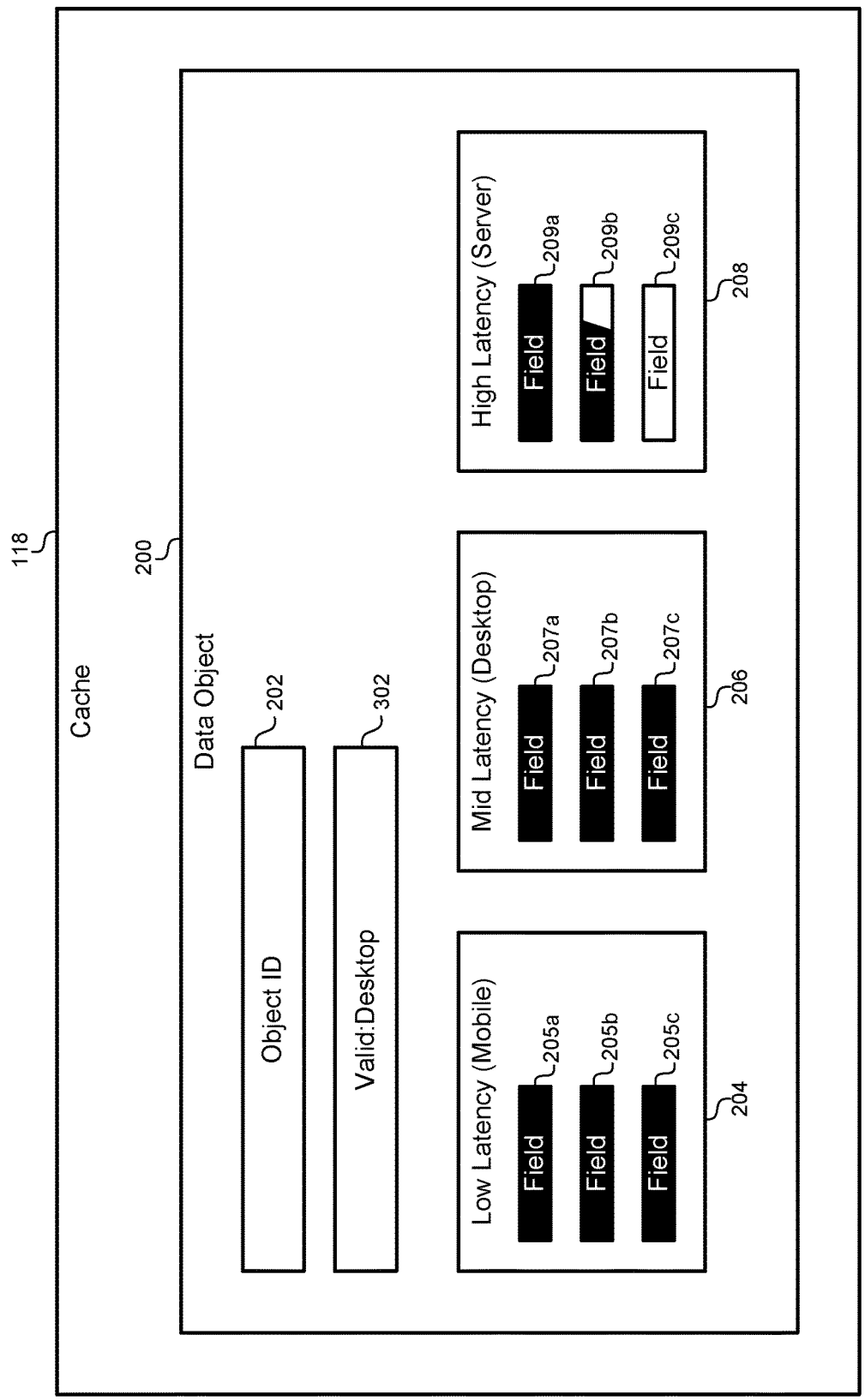
FIG. 3C illustrates the continued updating of the validity state for the data object as data is received, according to some embodiments.

FIG. 3C illustrates the continued updating of the validity state 302 for the data object 200 as data is received, according to some embodiments. At this stage in the example, all of the fields 207 in the desktop portion 206 of the data object 200 have been populated. By examining these fields and determining that they are complete, the server may make a determination that the validity state 302 of the data object 200 may be upgraded to "valid:desktop" indicating that the data object 200 is now ready for use by desktop configurations of the application.

In some embodiments, the values for the validity state 302 may be organized as a hierarchy of validity states. A higher validity state may imply validity in each of the lower validity states. In this example, when the data object 200 has a validity state of valid:desktop, this may imply that the data object 200 is also valid for mobile configurations of the application. An assumption may be made that all of the fields 205 in the mobile portion 204 have been received if all the fields 207 in the desktop portion 206 have been received. Alternatively, some embodiments may only allow the validity state 302 to upgrade into the valid:desktop state if the mobile portion 204 has also been completed. For example, if the desktop portion 206 completed before the mobile portion 204, the validity state 302 may transition directly from the invalid state to the valid:desktop state when the mobile portion 204 completes. In many cases, the fields 205 in the mobile portion 204 may also be used by desktop configurations of the application.

Because desktop computing devices may have larger display screens and more processing power, they may use data from the mobile portion 204 along with data from the desktop portion 206. Similarly, the server configurations of the application may use all of the data in the data object 200. Therefore, the validity state 302 would be upgraded to the valid:server state when all of the portions 204, 206, 208 of the data object 200 in the hierarchy are populated.

FIG. 4 illustrates different orchestration flows that may be used to populate the portions 204, 206, 208 of the data object 200, according to some embodiments. As described briefly above, some embodiments may organize the fields in the data object 200 into various portions 204, 206, 208 based on orchestration flows that retrieve data for their corresponding fields. FIG. 4 illustrates various orchestration flows that may be used for populating these portions. These orchestration flows are provided only by way of example, and it will be understood that any type of orchestration flow in a containerized or orchestrated environment may be used to populate data fields. Furthermore, even though a single orchestration flow is illustrated for each portion, other embodiments may use a plurality of orchestration flows for each portion without limitation.

In this example, and orchestration flow 402 may be used to populate the mobile portion 204 of the data object 200. This orchestration flow 402 may be event based and may use standard APIs or other interfaces to extract information from databases that are readily available to the orchestration flow. A second orchestration flow 404 may be associated with the desktop portion 206. This orchestration flow 404 may include longer-latency processes, such as interactions with other applications, feeds, channels, or users. An orchestration flow 406 for the server portion 208 may include operations that require further processing and/or high-latency external systems to populate the corresponding fields 209. In the example of a customer data object, operations may include CRM applications that analyze the customer data for leads, opportunities, engagements, and/or alerts/notifications that have been sent/received for the customer.

In some embodiments, the validity state 302 may be updated when an orchestration flow for a corresponding portion is completed. For example, when the orchestration flow 402 for the mobile portion 204 has completed execution, it may be determined that the corresponding fields 205 in the mobile portion 204 have been fully populated. At this point, the cache 118 may update the validity state 302 to be valid:mobile. If multiple orchestration flows are associated with portions of the data object 200, then the validity state 302 may be updated when each of the corresponding orchestration flows has successfully completed execution.

Some embodiments may use a single field for the validity state 302. This field may be updated with a new value as data is received by the data object. As described above, example values may include invalid, valid:mobile, valid:desktop, and so forth. A higher validity state in the hierarchy may imply validity in lower validity states. In other embodiments, the validity state 302 may include separate designators for each possible value. For example, some embodiments may include a field for each possible value for the validity state. These fields may be updated with values of true or false depending on whether the data object 200 is valid for that state. For example, a field in the validity state 302 designating validity for desktop configurations may be true while another field in the validity state 302 designating validity for mobile configurations may be false. This allows validity values to be organized in a nonhierarchical manner that need not rely on differences in latency.

Figure 5:
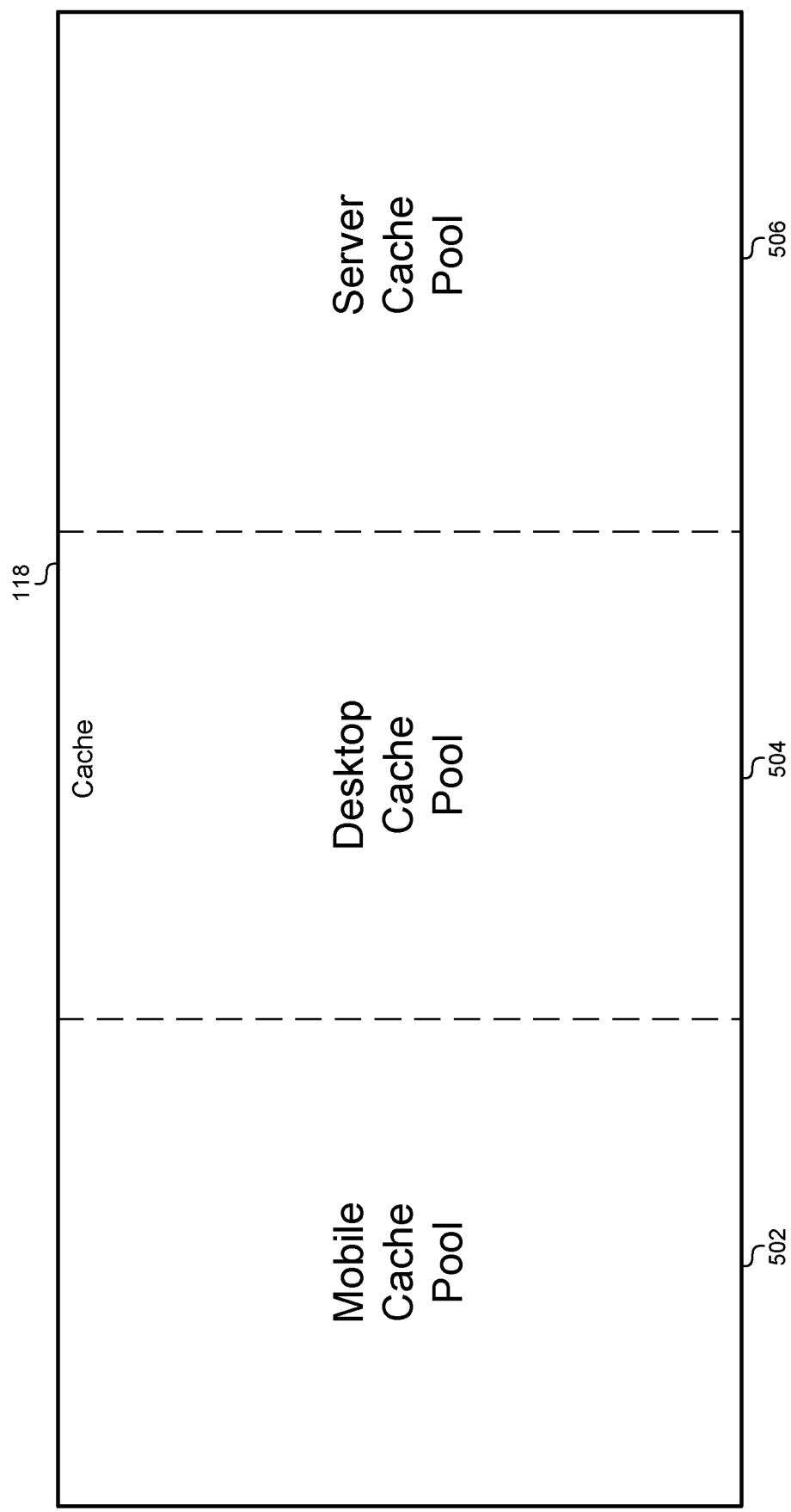
FIG. 5 illustrates a cache that is partitioned according to configurations of the application, according to some embodiments.

FIG. 5 illustrates a cache that is partitioned according to configurations of the application, according to some embodiments. In the examples above, the various portions of the data object 200 were stored in the cache 118 without consideration for specific cache locations. FIG. 5 illustrates how a cache 118 may be partitioned or subdivided into a plurality of partitions corresponding to the plurality of configurations of the application making requests to the cache 118. In this example, the cache 118 may be partitioned into a mobile cache partition 502, a desktop cache partition 504, and/or a server cache partition 506. These partitions may be virtual. For example, the cache 118 may size various partitions based on an amount of data that may be stored in each before it is overwritten. However, the cache 118 may still be the same physical and cache despite these partitions. For example, the same cache router 116 in FIG. 1 may manage and retrieve objects in each of the partitions 502, 504, 506 in FIG. 5. This may be contrasted with solutions that use separate caches for each application configuration where data may be duplicated between the separate caches. This example uses a single cache that is logically partitioned to store various portions of each single data object.

Figure 6A:
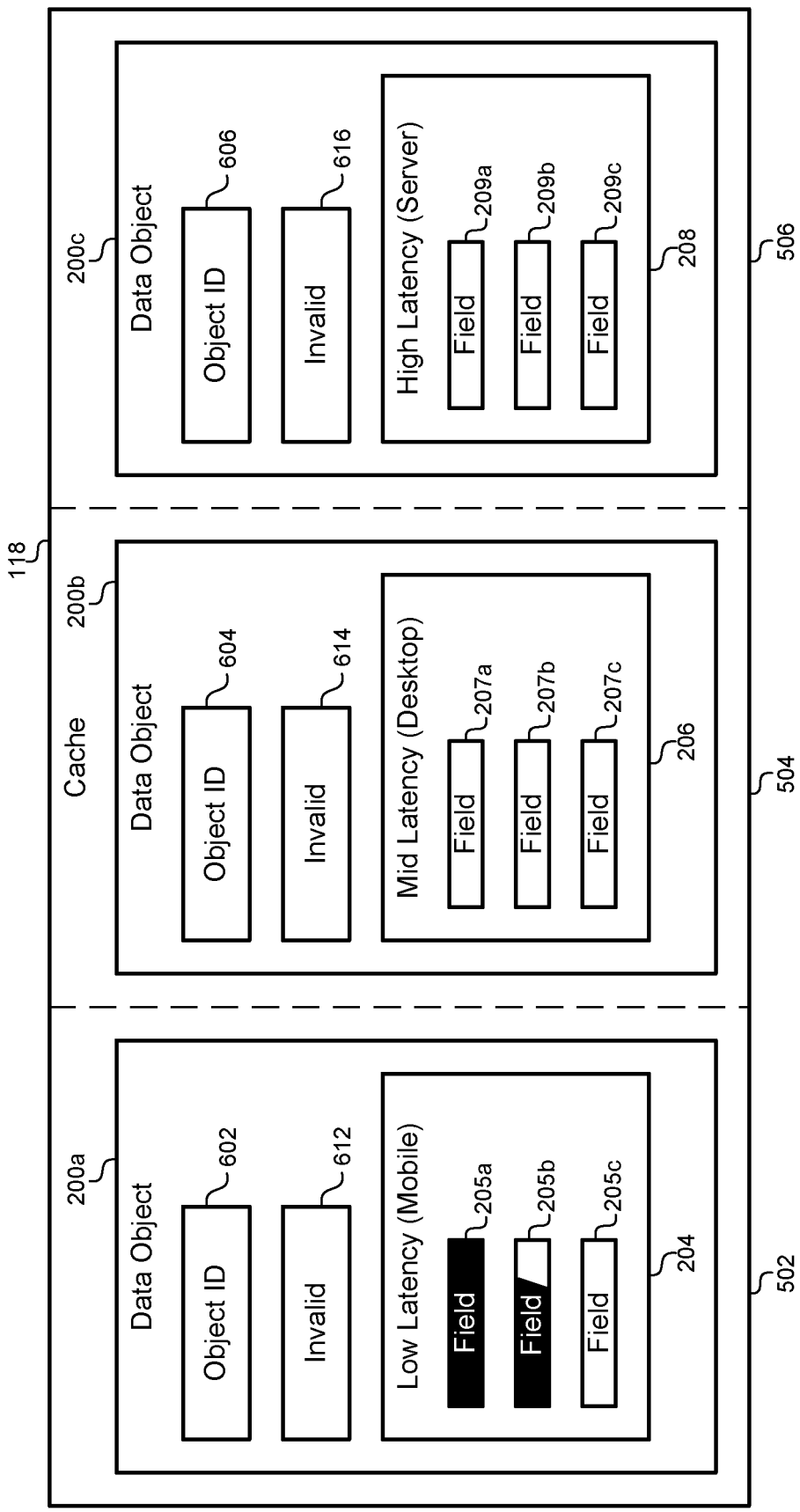
FIG. 6A illustrates how the partitions in the cache can be used to store various portions of the data object, according to some embodiments.

FIG. 6A illustrates how the partitions 502, 504, 506 in the cache 118 can be used to store various portions of the data object, according to some embodiments. The data object 200 may be the same data object used in the examples above in relation to FIGS. 3A-3C. Instead of receiving data and adding the received data to the same data object, the data object 200 may be subdivided and stored as different blocks in the cache 118 in each of the partitions. For example, as data for fields in the mobile portion 204 of the data object 200a are received, they may be stored as blocks in the mobile partition 502 of the cache 118. In this example, no data has yet been received for the fields in the desktop portion 206 or the server portion 208, thus no blocks need to be created at this point in the desktop portion 504 and/or the server portion 506. These blocks are illustrated in FIG. 6A to show where such data may be stored when received, but this does not necessarily imply that these blocks need to be allocated in these partitions 504, 506 until data is received.

Figure 6B:
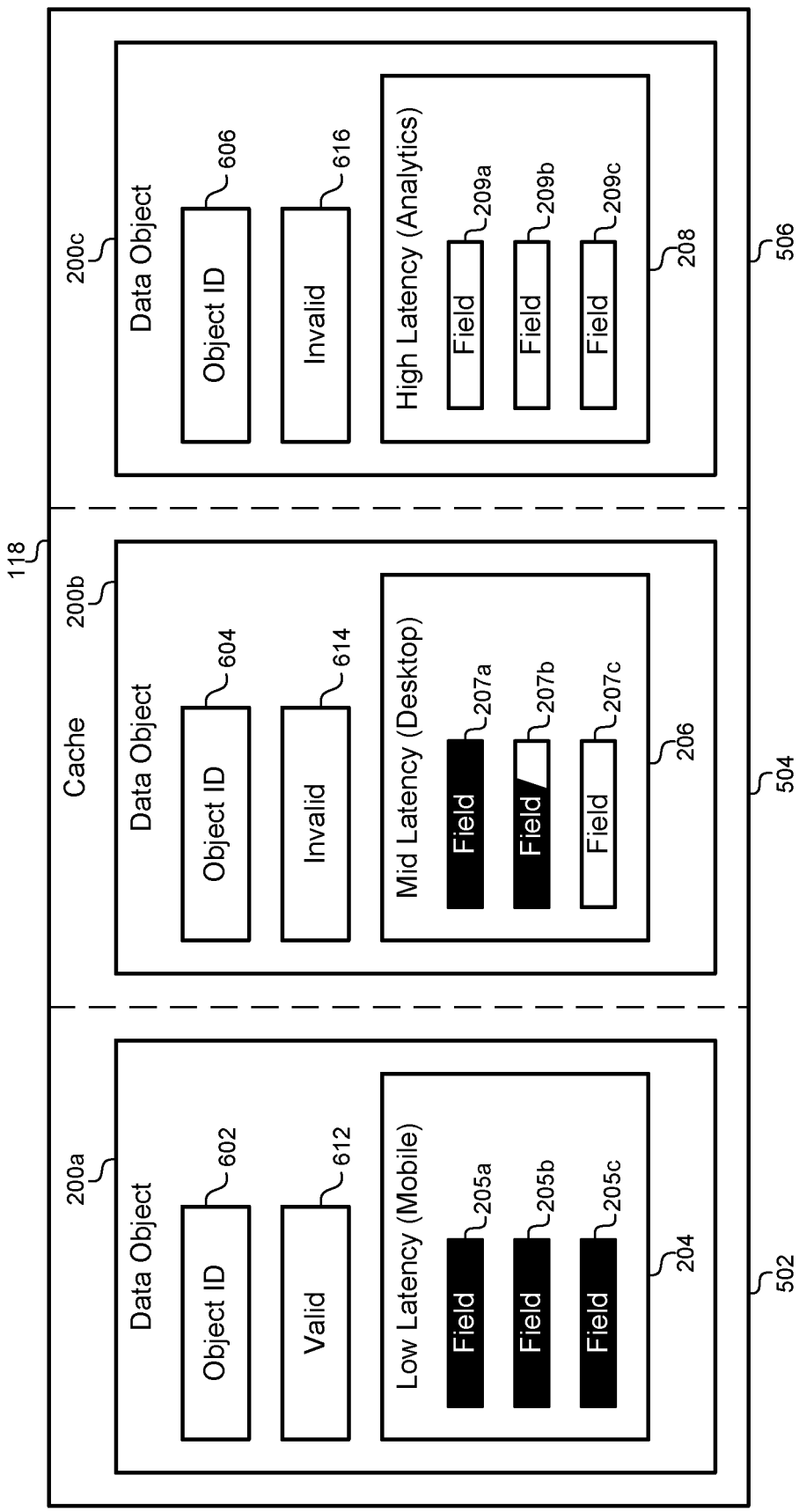
FIG. 6B illustrates how the partitioned cache can fill incrementally with independent validity states, according to some embodiments.

FIG. 6B illustrates how the partitioned cache can fill incrementally with independent validity states, according to some embodiments. At this stage, the fields 205 in the mobile portion 204 of the data object 200a have been received. The validity state 612 for the data object 200a in the mobile partition 502 may be updated to valid or valid:mobile. Note that distinction between validity for different configurations (e.g., mobile, desktop, etc.) need not be stored as separate values in the validity state 612, but rather can be implied based on the corresponding partition. For example, when a data object 200a is valid in the mobile partition 502, it may be assumed to be valid for mobile configurations of the application.

As the data in the mobile partition 502 becomes valid, the fields 207 in the desktop portion 206 are beginning to be populated. Note that the portion of the data object 200b stored in the desktop partition 504 has its own validity state 614, which is currently invalid. By having separate validity states 612, 614, the portions of the data object 200a, 200b may have their validity determined collectively and/or individually. For example, if the data is complete in the desktop portion 206, the corresponding data object 200b may be marked as valid even if the corresponding mobile portion 204 is not yet valid. The validity of the object 200 may be determined by examining the validity states 612, 614, 616 for each corresponding block in the various cache partitions 502, 504, 506. Each block in the various partitions may have its own object identifier 602, 604, 606 that links together the various portions of the object 200 in the various partitions 502, 504, 506. Thus, the validity of the overall object 200 may be determined based on the validity of each individual portion of the object 200a, 200b, 200c in the cache 118.

Figure 6C:
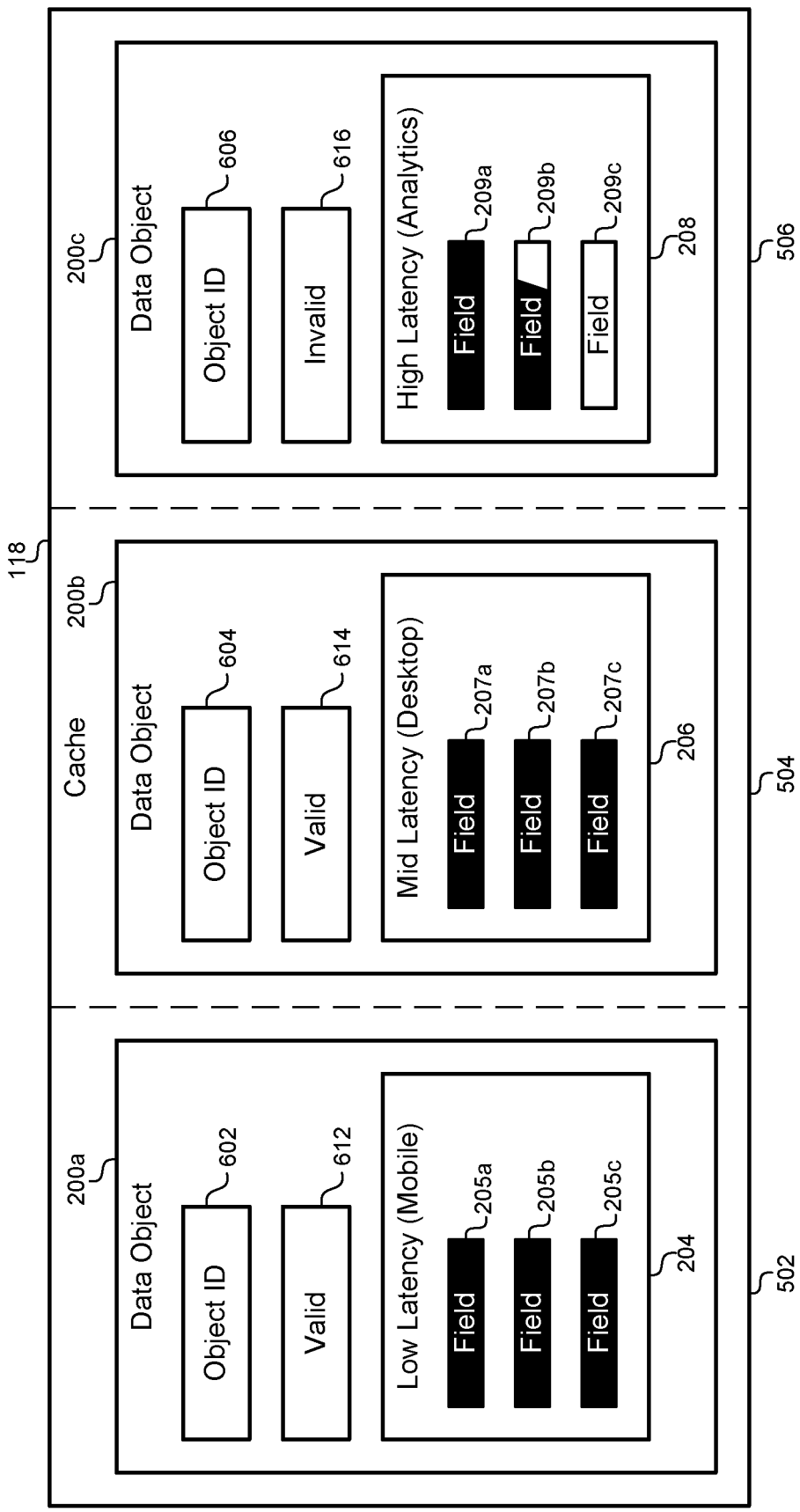
FIG. 6C illustrates further progression through validity states in a partitioned cache, according to some embodiments.

FIG. 6C illustrates further progression through validity states in a partitioned cache, according to some embodiments. In this example, the fields 207 are populated in the desktop portion 206 of the object 200 in the desktop partition 504, and the validity state 614 of that portion of the object 200b has been updated to valid. The overall validity of the data object 200 may be determined by examining the validity of each portion of the object 200. Because both the mobile portion 204 and the desktop portion 206 are valid, the overall validity state of the object 200 may be determined to be valid:desktop. When the fields 209 for the server portion 208 are completed and the corresponding validity state 616 becomes valid, the validity state of the overall object 200 may be upgraded to valid: server.

FIG. 7 illustrates how the size of various partitions in the cache 118 may be determined based on requests from configurations of the application, according to some embodiments. Generally, objects in the mobile partition 502 may be smaller than objects in the desktop partition 504, and objects in the desktop partition 504 may be smaller than objects in the server partition 506. However, this need not be the case. Some information in the server partition 506 may be relatively small compared to information in the mobile partition 502. Again, the designation for data belonging to the mobile, desktop, and/or server portions of a data object may be based on the configuration of the application that uses the data and/or the latency. Although size is often correlated to these metrics, it need not be so in every case. However, these relative size differences are used in FIG. 7 as a nonlimiting example.

Initially, the cache 118 may be partitioned into sections based on a number of requests received from corresponding configurations of the application. In this example, the partitions 502, 504, 506 may be approximately equal in size, anticipating an equal number of requests for the mobile data, desktop data, and server data. In other examples, the mobile partition 502 may be larger initially than the desktop partition 504, which in turn may be larger than the server partition 504. Considering that each request for server data inherently encompasses a request for desktop and mobile data, this type of partitioning may be more in line with an expected number of requests for the data. This may also reduce the number of times data is overwritten in the cache.

As described above, objects may be broken up into blocks and stored in various partitions in the cache 118 based on the type of data. For example, Object 1 is stored as a combination of object 701 in the mobile cache 502, object 711 in the desktop cache 504, and object 721 in the server cache 506. Similarly, Object 2 is stored as a combination of object 702, object 712, and object 722. However, Object 3 includes only object 703 and object 713. Object 4 includes object 704 and object 714. These two data objects 703, 704 do not have corresponding server portions stored in the server partition 506. As described above, these portions of Object 3 and Object 4 may have previously been stored in the server partition 506 and overwritten by more recent objects. Alternatively, Object 3 and/or Object 4 may have only been requested by desktop configurations of the application, and thus the server portions of these data objects may not have been loaded into the server partition 506. Similarly, Object 5 and Object 6 only include portions stored in the mobile partition 502 as objects 705, 706.

After operation of the cache begins, the number of mobile requests from mobile devices 104 may be more than the number of requests from desktop devices 102 for the reasons discussed above. As these requests are received, the equal sizes of the partitions 502, 504, 506 may no longer be optimally matched to the request traffic. Therefore, some embodiments may dynamically resize the cache partitions between various application configuration types.

Figure 8:
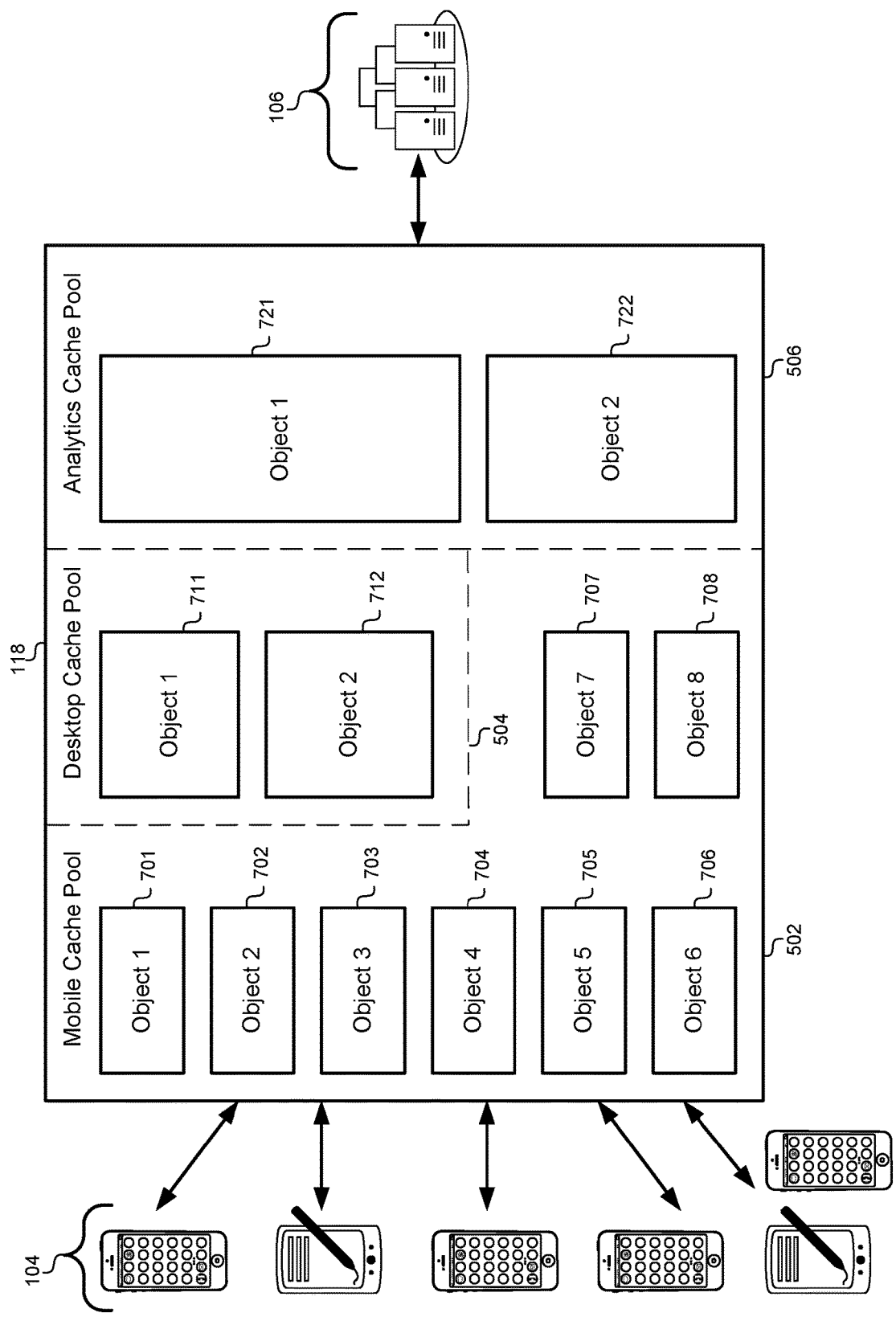
FIG. 8 illustrates a re-partitioning of the cache to dynamically adjust partition sizes based on request traffic, according to some embodiments.

FIG. 8 illustrates a re-partitioning of the cache 118 to dynamically adjust partition sizes based on request traffic, according to some embodiments. As requests from mobile configurations of the application increase, the cache 118 may be dynamically repartitioned such that the size of the mobile partition 502 is increased and the size of the desktop partition 504 is decreased. This may cause objects 713, 714 in the desktop partition 504 to be overwritten by new objects 707, 708 that are now placed in the new area of the mobile partition 502. Thus, the repartitioning of the cache 118 need not immediately affect any of the objects in the cache. Instead, the oldest objects in a repartitioned area of the cache may instead be marked for deletion when new objects from the mobile application configurations are received.

This repartitioning may take place dynamically as the cache 118 operates. If the requests from the mobile configuration of the application begin to decrease in frequency, then the cache 118 may be repartitioning to decrease the mobile partition 502 and subsequently increase the desktop partition 504.

Figure 9:
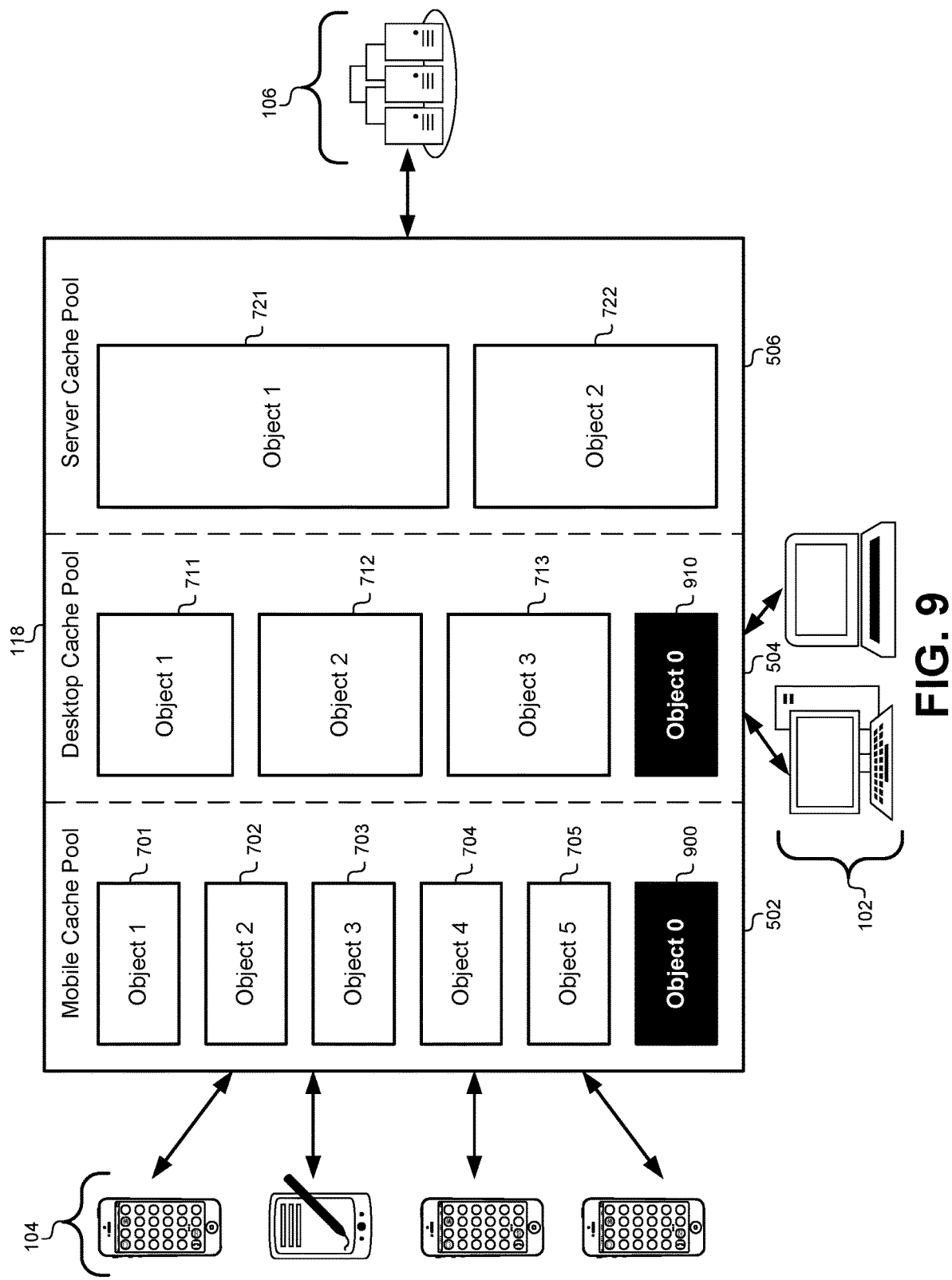
FIG. 9 illustrates how objects in the cache may be partially overwritten, according to some embodiments.

FIG. 9 illustrates how objects in the cache 118 may be partially overwritten, according to some embodiments. In this example, a new request may be received for Object O from one of the desktop configurations of the application 102. To retrieve the desktop data, the cache 118 may place and object 900 in the mobile partition 500 and object 910 in the desktop partition 504. To do so, the least-recently used objects in both of these partitions 502, 504 may be overwritten. Turning back to FIG. 7, object 706 and object 714 may be overwritten. Note that it is not required for any of the objects in the server partition 506 to be overwritten at this point, as no server data has been requested for a server configuration of the application. Also note that some embodiments may continue requesting information for server configurations of the application even if only a desktop configuration of the application requested the data object. This would result in overriding an object (e.g., Object 2) in the server partition 506.

As objects are overwritten in the cache 118, the validity state of existing objects in the cache may be downgraded. For example, if an object included both a mobile portion and a desktop portion in the cache 118, the validity state of the object would be valid:desktop. Later, if the portion of the object in the desktop partition 504 is overwritten, but the portion of the object in the mobile partition 502 is not overwritten, the validity state of the object may be downgraded to be valid:mobile. Instead of completely invalidating the validity state of the object, the validity state of the object can instead be updated such that any validity states that still apply can be maintained. This allows future requests from mobile configurations of the application to still receive the cached version of the mobile portion of the object, even though the desktop portion of the object has been deleted in the cache 118.

This cache policy improves upon previous cache policies in a number of ways. In previous caches, the entire object would be written into the cache regardless of the type of configuration of the application making the request. This configuration allows only the portions of an object that are needed by a particular application configuration to be loaded, thereby maximizing the number of objects that can be represented in the cache simultaneously.

Additionally, as mobile devices become more prevalent and begin to dominate request traffic, more of the smaller mobile object portions may be stored in the mobile partition 502. This may dramatically decrease the mobile response time from the server as more mobile data objects are represented in the cache resulting in fewer cache misses.

Figure 10:
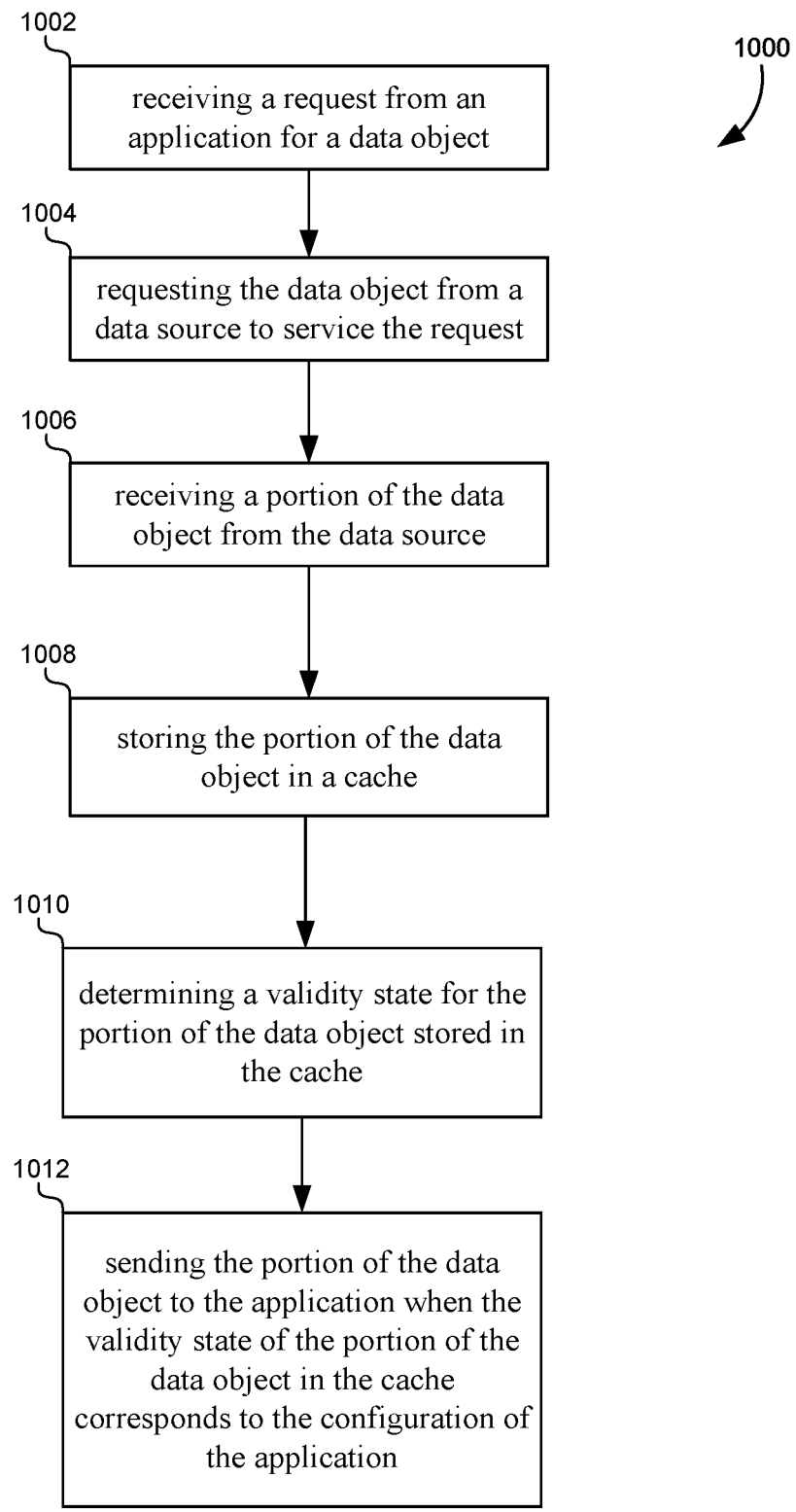
FIG. 10 illustrates a flowchart of a method for using multiple cache validity states to service different application configurations, according to some embodiments.

FIG. 10 illustrates a flowchart 1000 of a method for using multiple cache validity states to service different application configurations, according to some embodiments. The method may include receiving a request from an application for a data object (1002). The request may be received from an application that is configured to operate in a plurality of configurations, and the application may be currently operating a first configuration in that plurality of configurations. For example, the configuration of the application may be based on a device type on which the application operates, such as a mobile device, a server device, a desktop device, and so forth. The request may be received by a middle-tier server that acts as a Web server and/or an application server. The server may include a data cache that stores data objects responsive to requests from client devices. The server and device communications may take place as described above, such as in relation to FIG. 1.

The method may additionally include requesting the data object from a data source to service the request (1004). A determination may be made that the data object is not in the cache at the server and should instead be requested from a data source (e.g., a cache miss). The request may go through one or more orchestration flows as illustrated above in FIG. 4. The data source may include a plurality of different data sources, and may include processes, databases, applications, external systems, web services, APIs, and so forth as described above.

The method may additionally include receiving a portion of the data object from the data source (1006). The data object may be divided into a plurality of data portions as described above in FIGS. 3A-3B. These data portions may correspond to the different application configurations. These data portions may also correspond to a plurality of validity states for the data object in the cache. These data portions may also be grouped according to relative latency, size, or any other metric. In some cases, the portion of the data object need not represent the entire data object, such that additional fields in the data object still remain to be received from the data source as a remaining portion of the data object. The portion of the data object may be received incrementally as individual fields are populated from orchestration flows or various sources within the data source.

The method may further include storing the portion of the data object in the cache (1008). In some embodiments, the cache need not be divided into different partitions, and the portion of the data object can be stored as one object in the data cache. In other embodiments, the cache may be partitioned into a plurality of partitions where corresponding portions of the data object are stored. The data object may be divided up according to the various portions and stored in different petitions of the cache as illustrated above in FIGS. 5-9. These cache partitions may be resized dynamically to accommodate request traffic from different configurations of the application. For example, cache partitions may be sized or resized based on the number of requests received from client devices operating the application each of the configurations.

The method may also include determining a validity state for the portion of the data object stored in the cache (1010). This determination may be made dynamically at any point as the portion of the data object is being received from the data source. In some embodiments, this determination may be triggered when an orchestration flow is completed and a portion of the data object has been completely populated. The validity state may be assigned from a plurality of validity states, each of which corresponds to one of the plurality of configurations of the application. For example, validity states may be defined by values such as invalid, valid:mobile, valid:desktop, valid:server, and so forth. Validity states may be assigned to indicate that enough of the data object has been populated in the cache to service that corresponding configuration of the application as described above in FIGS. 3-9.

The method may additionally include sending the portion of the data object to the application when the validity state of the portion of the data object in the cache corresponds to the configuration of the application (1012). For example, when the validity state is valid:mobile, the cache may send the portion of the data object to a mobile configuration of the application. In some embodiments, the cache may continue to populate additional portions of the data object after sending the response to the client device. In other embodiments, the cache may stop populating the cache with portions of the data object that may correspond to higher validity states, such as valid:desktop, and so forth.

It should be appreciated that the specific steps illustrated in FIG. 10 provide particular methods of using multiple cache validity states to service different application configurations according to various embodiments. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system.

Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
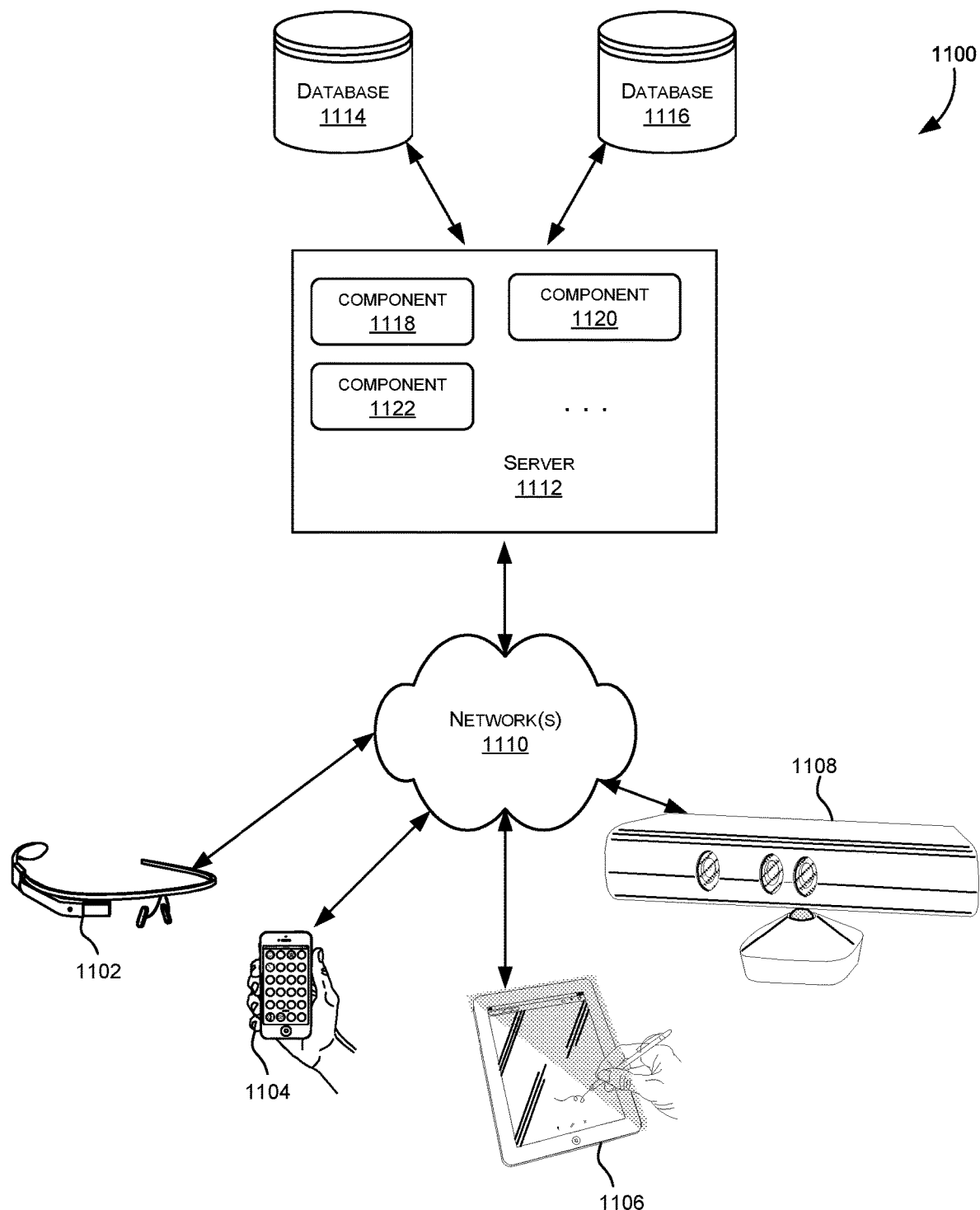
FIG. 11 illustrates a simplified block diagram of a distributed system for implementing some of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or midtier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
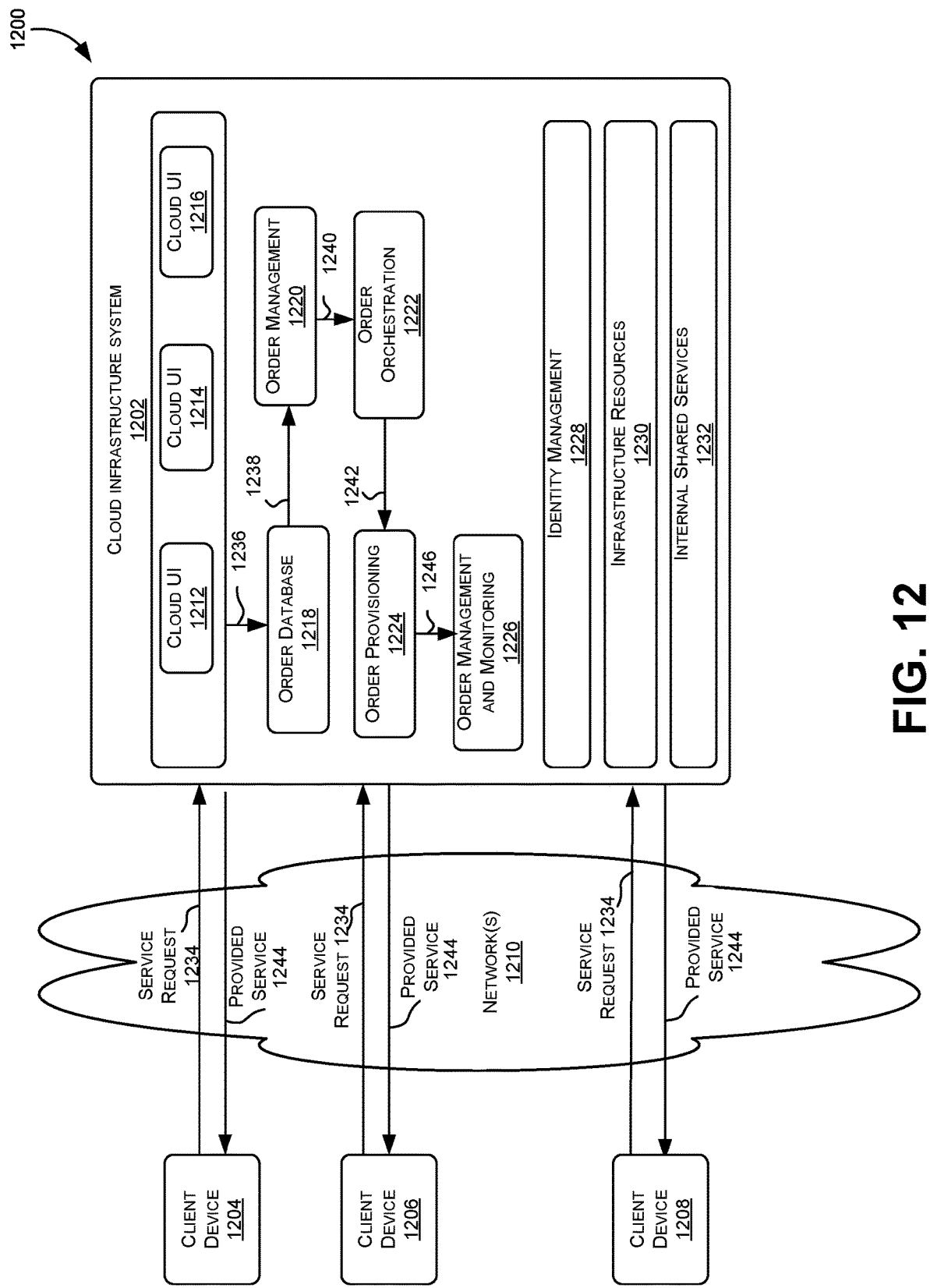
FIG. 12 illustrates a simplified block diagram of components of a system environment by which services provided by the components of an embodiment system may be offered as cloud services.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the embodiment shown in the figure is only one example of a cloud infrastructure system that may incorporate an embodiment of the invention. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for network(s) 1110.

Cloud infrastructure system 1202 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
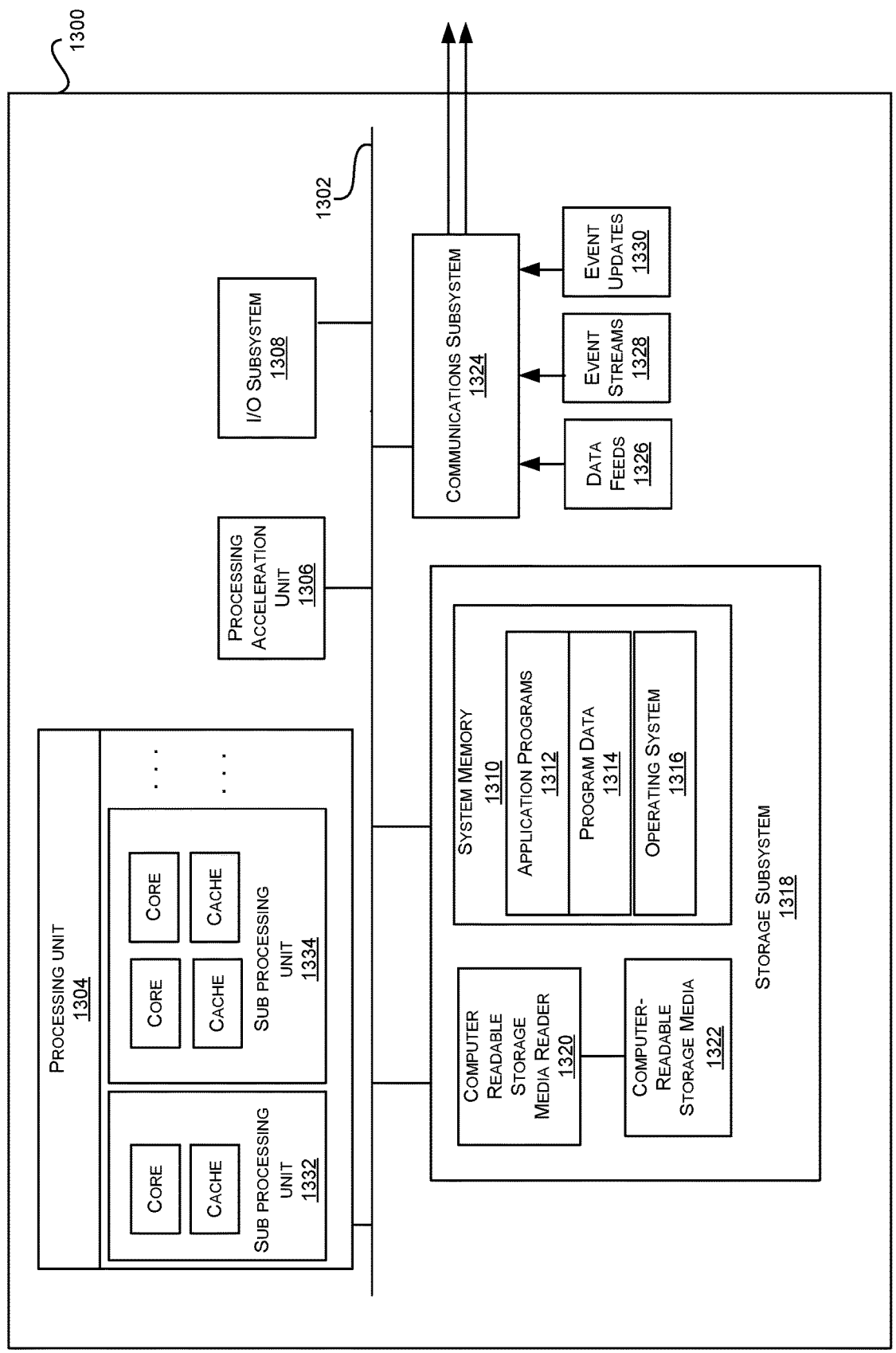
FIG. 13 illustrates an exemplary computer system, in which various embodiments may be implemented.

FIG. 13 illustrates an exemplary computer system 1300, in which various embodiments of the present invention may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, midtier applications, relational database management systems (RDBMS), etc., program data 1314, and an operating system 1316. By way of example, operating system 1316 may include various versions of Microsoft Windows®, Apple Macintosh®, and/ or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present invention.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
   receiving a request from an application for a data object, wherein:
      the application is configured to operate in a plurality of configurations; and
      the application is operating in a first configuration in the plurality of configurations when the request is sent;
   requesting the data object from a data source to service the request;
   receiving a portion of the data object from the data source;
   storing the portion of the data object in a cache;
   determining a validity state for the portion of the data object stored in the cache, wherein:
      the validity state is assigned from a plurality of validity states; and
      the plurality of validity states correspond to the plurality of configurations of the application; and
   sending the portion of the data object to the application when the validity state of the portion of the data object in the cache corresponds to the first configuration.

2. The non-transitory computer-readable medium of claim 1, wherein the cache is stored on a middle-tier server.

3. The non-transitory computer-readable medium of claim 2, wherein the middle-tier server comprises an application server that is distinct from a client device on which the application operates in the first configuration and distinct from the data source from which the portion of the data object is received.

4. The non-transitory computer-readable medium of claim 1, wherein the plurality of configurations correspond to client device types on which the application is configured to operate.

5. The non-transitory computer-readable medium of claim 4, wherein the first configuration in the plurality of configurations corresponds to a mobile client device type.

6. The non-transitory computer-readable medium of claim 4, wherein the first configuration in the plurality of configurations corresponds to a desktop client device type.

7. The non-transitory computer-readable medium of claim 4, wherein the first configuration in the plurality of configurations corresponds to a analytics or server client device type.

8. The non-transitory computer-readable medium of claim 1, wherein the data object comprises a plurality of data portions corresponding to the plurality of validity states.

9. The non-transitory computer-readable medium of claim 8, determining the validity state for the at least of portion of the data object stored in the cache comprises:
determining whether the portion of the data object includes a data portion in the plurality of data portions corresponding to the validity state.

10. The non-transitory computer-readable medium of claim 1, wherein the plurality of validity states comprises a hierarchy such that validity in a higher validity state implies validity in lower validity states.

11. The non-transitory computer-readable medium of claim 10, wherein:
the plurality of validity states comprises a mobile device validity state;
the plurality of validity states comprises a desktop device validity state;
the desktop device validity state is higher than the mobile device validity state in the hierarchy; and
validity in the desktop device validity state implies validity in the mobile device validity state.

12. The non-transitory computer-readable medium of claim 10,
wherein the operations further comprise:
receiving a remaining portion of the data object from the data source after the validity state of the portion of the data object in the cache corresponds to the first configuration; and
causing the cache to not store the remaining portion of the data object from the data source.

13. The non-transitory computer-readable medium of claim 12, wherein
the operations further comprise:
receiving a second request from a second application for the data object, wherein the second application is operating in the first configuration;
retrieving the portion of the data object from the cache without requesting the remaining portion of the data object from the data source; and
sending the portion of the data object to the second application.

14. The non-transitory computer-readable medium of claim 12, wherein
the operations further comprise:
receiving a second request from a second application for the data object, wherein the second application is operating in a second configuration in the plurality of configurations;
requesting the data object from the data source to service the second request;
receiving a second portion of the data object from the data source;
storing the second portion of the data object in the cache;
determining a validity state for the portion of the data object and the second portion of the data object stored in the cache; and
sending the portion of the data object and the second portion of the data object to the application when the validity state of the portion of the data object and the second portion of the data object in the cache corresponds to the second configuration of the application.

15. The non-transitory computer-readable medium of claim 1, wherein each of the plurality of configurations corresponds to separate orchestration streams.

16. The non-transitory computer-readable medium of claim 15, wherein determining the validity state for the portion of the data object stored in the cache comprises:
determining when the portion of the data object is received from one of the separate orchestration streams corresponding to the first configuration.

17. The non-transitory computer-readable medium of claim 1, wherein the operations further comprise:
partitioning the cache into a plurality of partitions corresponding to the plurality of configurations.

18. The non-transitory computer-readable medium of claim 17, wherein the operations further comprise:
sizing or resizing the plurality of partitions based on a number requests received from client devices operating the application in each of the plurality of configurations.

19. A method of using multiple cache validity states to service different application configurations, the method comprising:
receiving a request from an application for a data object, wherein:
the application is configured to operate in a plurality of configurations; and
the application is operating in a first configuration in the plurality of configurations when the request is sent;
requesting the data object from a data source to service the request;
receiving a portion of the data object from the data source;
storing the portion of the data object in a cache;
determining a validity state for the portion of the data object stored in the cache, wherein:
the validity state is assigned from a plurality of validity states; and
the plurality of validity states correspond to the plurality of configurations of the application; and
sending the portion of the data object to the application when the validity state of the portion of the data object in the cache corresponds to the first configuration.

20. A system comprising:
one or more processors; and
one or more memory devices comprising instructions that, when executed by the one or more processors, cause the one or more processors to perform operations comprising:
receiving a request from an application for a data object, wherein:
the application is configured to operate in a plurality of configurations; and
the application is operating in a first configuration in the plurality of configurations when the request is sent;
requesting the data object from a data source to service the request;
receiving a portion of the data object from the data source;
storing the portion of the data object in a cache;
determining a validity state for the portion of the data object stored in the cache, wherein:
the validity state is assigned from a plurality of validity states; and
the plurality of validity states correspond to the plurality of configurations of the application; and sending the portion of the data object to the application when the validity state of the portion of the data object in the cache corresponds to the first configuration.

* * * * *

UNITED STATES PATENT AND TRADEMARK OFFICE
CERTIFICATE OF CORRECTION

PATENT NO.        : 11,057,488 B2
APPLICATION NO.   : 16/696415
DATED             : July 6, 2021
INVENTOR(S)       : Chandrasekaran et al.

It is certified that error appears in the above-identified patent and that said Letters Patent is hereby corrected as shown below:

On the Title Page

Column 2, under Other Publications, Line 2, delete "htpps:" and insert -- https: --, therefor.

In the Specification

In Column 7, Line 6, delete "alternatively" and insert -- Alternatively --, therefor.

In Column 7, Line 54, delete "a an" and insert -- an --, therefor.

In Column 13, Line 56, delete "O" and insert -- 0 --, therefor.

In Column 14, Lines 29-34, delete "Additionally, as mobile devices become more prevalent and begin to dominate request traffic, more of the smaller mobile object portions may be stored in the mobile partition 502. This may dramatically decrease the mobile response time from the server as more mobile data objects are represented in the cache resulting in fewer cache misses." and insert the same on Column 14, Line 28 as a continuation of the same paragraph.

In Column 27, Line 27, delete "beeen" and insert -- been --, therefor.

In the Claims

In Column 29, Line 9, in Claim 9, delete "at least of portion" and insert -- portion --, therefor.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*